(12) United States Patent
Ford et al.

(10) Patent No.: US 10,489,563 B2
(45) Date of Patent: Nov. 26, 2019

(54) METHOD AND SYSTEM FOR INCORPORATING MARKETING IN USER AUTHENTICATION

(71) Applicant: Swipe Ads Holdings Pty Ltd, Queensland (AU)

(72) Inventors: Matthew Michael Ford, Queensland (AU); Kevin John Gosschalk, Queensland (AU)

(73) Assignee: Swipe ADS Holdings Pty. Ltd., Brisbane (AU)

( * ) Notice: Subject to any disclaimer, the term of this patent is extended or adjusted under 35 U.S.C. 154(b) by 719 days.

(21) Appl. No.: 14/694,123

(22) Filed: Apr. 23, 2015

(65) Prior Publication Data
US 2015/0317700 A1    Nov. 5, 2015

(30) Foreign Application Priority Data

May 5, 2014    (AU) .................................. 2014901637

(51) Int. Cl.
*G06Q 30/02*    (2012.01)
*G06F 21/31*    (2013.01)
*G06F 21/36*    (2013.01)

(52) U.S. Cl.
CPC .............. *G06F 21/31* (2013.01); *G06F 21/36* (2013.01); *G06Q 30/0277* (2013.01); *G06F 2221/2133* (2013.01); *G06Q 2220/10* (2013.01)

(58) Field of Classification Search
CPC .... G06Q 30/02; G06Q 30/0241; G06Q 20/32; G06Q 20/3437; G06Q 30/0208; G06Q 20/353; G06Q 20/3674; G06Q 20/385; G06Q 30/0215; G06F 21/31; G06F 21/36
See application file for complete search history.

(56) References Cited

U.S. PATENT DOCUMENTS

| | | | |
|---|---|---|---|
| 7,406,508 B1* | 7/2008 | Herrmann | G06Q 30/02 463/26 |
| 8,510,795 B1* | 8/2013 | Gargi | G09B 5/06 382/276 |
| 2002/0038302 A1* | 3/2002 | Maeda | G06Q 30/02 |
| 2002/0095573 A1* | 7/2002 | O'Brien | H04L 63/0823 713/168 |
| 2002/0194499 A1* | 12/2002 | Audebert | H04L 63/0853 726/35 |

(Continued)

*Primary Examiner* — Johann Y Choo
(74) *Attorney, Agent, or Firm* — Blank Rome LLP

(57) ABSTRACT

A method, system and computing device for incorporating marketing into a user authentication enables valuable marketing information to be received from or provided to users, in an authentication context where the users are likely to be attentive and focused. Thus marketing information is likely to be thoroughly reviewed by the users, easily recalled by the users at a later time, and user profile data collected from the users is likely to be accurate. The method includes presenting an authentication challenge to a user of a computing device, the authentication challenge including a number of challenge elements; receiving a response to the authentication challenge from the user; and presenting a non-authentication marketing activity to the user, the non-authentication marketing activity including a number of activity elements, and where the activity elements correspond with the challenge elements.

19 Claims, 22 Drawing Sheets

(56) References Cited

U.S. PATENT DOCUMENTS

| | | | |
|---|---|---|---|
| 2005/0027602 A1* | 2/2005 | Haddad | G06Q 20/108 |
| | | | 705/17 |
| 2005/0055306 A1* | 3/2005 | Miller | G06Q 10/10 |
| | | | 705/37 |
| 2012/0210011 A1* | 8/2012 | Liu | H04L 63/10 |
| | | | 709/229 |
| 2013/0073384 A1* | 3/2013 | Qiu | H04L 65/4084 |
| | | | 705/14.49 |
| 2014/0325028 A1* | 10/2014 | Jiang | H04L 67/18 |
| | | | 709/219 |

* cited by examiner

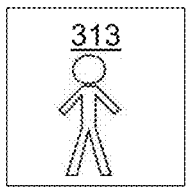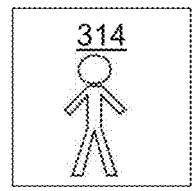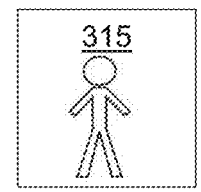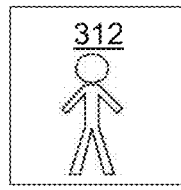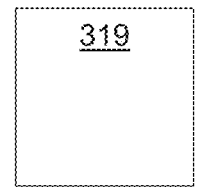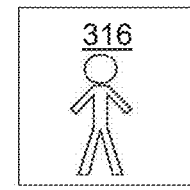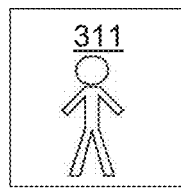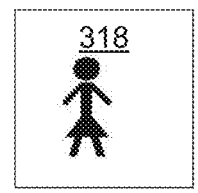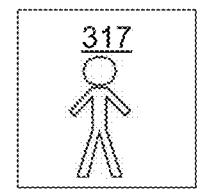
FIG. 3

400
420
Move your favourite car into middle
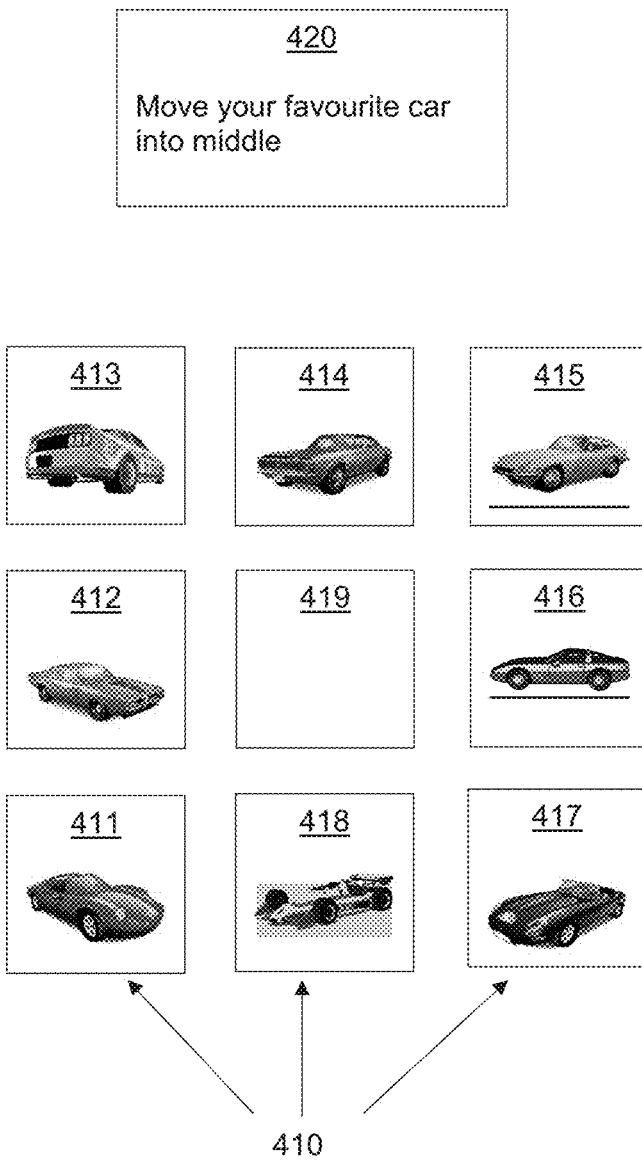
| 413  | 414  | 415  |
|---|---|---|
| 412  | 419 | 416  |
| 411  | 418  | 417  |
410
FIG. 4

1400

1410 Presenting an authentication challenge to a user of a computing device, the authentication challenge including a number of challenge elements

1420 Receiving a response to the authentication challenge from the user

1430 Presenting a non-authentication marketing activity to the user, the non-authentication marketing activity including a number of activity elements;
wherein the activity elements correspond with the challenge elements and wherein the non-authentication marketing activity is presented to the user after a correct response to the authentication challenge is received.

1710 Presenting an authentication challenge to a user of a computing device, the authentication challenge including a number of challenge elements, wherein presenting the authentication challenge includes presenting a challenge instruction to the user on how to perform the authentication challenge.

1720 Receiving a response to the authentication challenge from the user

1730 Presenting a non-authentication marketing activity to the user, the non-authentication marketing activity including a number of activity elements;
wherein the activity elements correspond with the challenge elements.

1910 Presenting an authentication challenge to a user of a computing device, the authentication challenge including a number of challenge elements, wherein a plurality of authentication challenges is presented to the user, and each authentication challenge is presented in sequence.

1920 Receiving a response to the authentication challenge from the user

1930 Presenting a non-authentication marketing activity to the user, the non-authentication marketing activity including a number of activity elements;
wherein the activity elements correspond with the challenge elements.

2110 Presenting an authentication challenge to a user of a computing device, the authentication challenge including a number of challenge elements, wherein one of the challenge elements is associated with a correct response to a challenge instruction, and a plurality of the challenge elements are associated with an incorrect response to a challenge instruction.

2120 Receiving a response to the authentication challenge from the user

2130 Presenting a non-authentication marketing activity to the user, the non-authentication marketing activity including a number of activity elements;
wherein the activity elements correspond with the challenge elements.

2210 Presenting an authentication challenge to a user of a computing device, the authentication challenge including a number of challenge elements, wherein the challenge elements include one of a plurality of visual components, a plurality of audio components, and a plurality of audio-visual components.

2220 Receiving a response to the authentication challenge from the user

2230 Presenting a non-authentication marketing activity to the user, the non-authentication marketing activity including a number of activity elements;
wherein the activity elements correspond with the challenge elements.

2310 Presenting an authentication challenge to a user of a computing device, the authentication challenge including a number of challenge elements, wherein the challenge elements include a plurality of visual components in the form of challenge images, and wherein the challenge images include one or more of the following: a number of distinct images; a single image with distinct images visible within the single image; images configured in a spatial arrangement formed at least in part by the plurality of challenge images.

2320 Receiving a response to the authentication challenge from the user

2330 Presenting a non-authentication marketing activity to the user, the non-authentication marketing activity including a number of activity elements;
wherein the activity elements correspond with the challenge elements.

2410 Presenting an authentication challenge to a user of a computing device, the authentication challenge including a number of challenge elements 2420 Receiving a response to the authentication challenge from the user.

2430 Presenting a non-authentication marketing activity to the user, the non-authentication marketing activity including a number of activity elements;
wherein the activity elements correspond with the challenge elements and wherein the activity elements include a plurality of visual components in the form of activity images configured in a grid formed at least in part by the plurality of activity images.

2510 Presenting an authentication challenge to a user of a computing device, the authentication challenge including a number of challenge elements, wherein the challenge elements include a plurality of audio components in the form of challenge audio clips, wherein each challenge audio clip is presented sequentially to the user 2520 Receiving a response to the authentication challenge from the user.

2530 Presenting a non-authentication marketing activity to the user, the non-authentication marketing activity including a number of activity elements;
wherein the activity elements correspond with the challenge elements.

METHOD AND SYSTEM FOR INCORPORATING MARKETING IN USER AUTHENTICATION

FIELD OF THE INVENTION

This invention relates generally to a method and system for incorporating marketing in user authentication, and in particular to obtaining user profile data while authenticating a user.

BACKGROUND TO THE INVENTION

Authentication programs are commonly used to ensure that information entered into a computer, such as via a web site, is entered by a human user of a computing device rather than by an automated program commonly known as a 'bot' or an 'agent'.

Agents are commonly used by computer hackers in order to gain illicit entry to web sites, or to cause malicious damage, for example by creating a large amount of data in order to cause a computer system to crash, by creating a large number of fictitious email addresses in order to send spam, by skewing results of a vote or poll, by entering a contest many times, or by guessing a password or decryption key through a method known as "brute force".

One example of such a user authentication program presents a string of random characters to a user, and in response the user enters the presented characters. If the user enters the characters correctly, the user is allowed to proceed.

However, agents have adapted to include character recognition in order to circumvent such authentication programs. In response, authentication programs such as CAPTCHA ("Completely Automated Public Turing test to tell Computers and Humans Apart") programs have been developed to disguise test characters, for example by adding background noise, or randomly positioning the characters on the screen, rather than in pre-defined rows. Although such programs are generally successful at preventing agents from accessing a computer, it also can be difficult for human users to read such disguised characters. As such, CAPTCHA authentication programs often can be frustrating and tedious to use.

Further, it is well known that obtaining accurate and up-to-date user or customer profile data is a significant challenge for many organisations. Companies and other organisations spend huge sums, or make significant efforts, attempting to obtain accurate customer profile data, such as customer preferences, tastes, habits, and demographic data. That is because it is well established that accurate customer profile data can greatly increase marketing effectiveness and improve sales. However, customers are often frustrated and irritated by the collection of such information, including customer survey forms, registration forms, warranty forms, telemarketing and other techniques used to gain customer profile data. Customers therefore often ignore requests for customer profile data, or customers may provide inaccurate or incomplete customer profile data.

Further, it is well known that companies and other organisations spend huge sums, or make significant efforts, attempting to ensure that real, human consumers view particular marketing materials, and pay each time these materials are viewed. However, agents can generate false impressions that a real human has viewed the material, when in fact no real human has done so. Companies and other organisations lose the effect of the money they pay by spending for these false impressions. As the number of agents rises, the market price falls for each viewing of marketing materials, creating undesirable marketplace distortions. Companies and other organisations wish to pay only for real humans viewing the marketing materials, and stop agents from doing so.

There is therefore a need for an improved method and system for incorporating marketing in user authentication.

OBJECT OF THE INVENTION

It is an object of some embodiments of the present invention to provide consumers with improvements and advantages over the above described prior art, and/or overcome and alleviate one or more of the above described disadvantages of the prior art, and/or provide a useful commercial choice.

SUMMARY OF THE INVENTION

In one form, although not necessarily the only or broadest form, the invention resides in a method for incorporating marketing into a user authentication, including:

presenting an authentication challenge to a user of a computing device, the authentication challenge including a number of challenge elements;

receiving a response to the authentication challenge from the user; and presenting a non-authentication marketing activity to the user, the non-authentication marketing activity including a number of activity elements;

wherein the activity elements correspond with the challenge elements.

Preferably, a response to the non-authentication marketing activity is recorded after a correct response to the authentication challenge is received.

Preferably, a response to the non-authentication marketing activity is transmitted after a correct response to the authentication challenge is received.

Preferably, the non-authentication marketing activity is presented to the user after a correct response to the authentication challenge is received.

Preferably, the non-authentication marketing activity is a marketing data collection activity.

Preferably a configuration of the activity elements corresponds with a configuration of the challenge elements.

Preferably, presenting the authentication challenge includes presenting a challenge instruction to the user on how to perform the authentication challenge.

Preferably, a time to complete the authentication challenge is limited and predefined. Preferably, a plurality of authentication challenges is presented to the user, each authentication challenge being presented in sequence.

Preferably, presenting the non-authentication marketing activity includes presenting an activity instruction to the user on how to perform the non-authentication marketing activity. Preferably, a plurality of non-authentication marketing activities is presented to the user, each non-authentication marketing activity being presented in sequence.

Preferably, the activity instruction corresponds at least in part with the challenge instruction.

Preferably, one or more of the challenge elements are associated with a correct response to the challenge instruction. Preferably, one or more of the challenge elements are associated with an incorrect response to the challenge instruction. Even more preferably, one of the challenge elements is associated with a correct response to the challenge instruction, and a plurality of the challenge elements are associated with an incorrect response to the challenge question.

Preferably, the challenge elements include one of a plurality of visual components, a plurality of audio components, and a plurality of audio-visual components. Preferably, the activity elements include one of a plurality of audio components, a plurality of visual components and a plurality of audio-visual components.

Preferably, the challenge elements include a plurality of visual components in the form of challenge images. Preferably, the challenge images include a number of distinct images. In another embodiment, the challenge images include a single image with distinct images visible within the single image. Preferably, the challenge images are configured in a spatial arrangement formed at least in part by the plurality of challenge images. In one embodiment, the spatial arrangement is in the form of a grid. Preferably, a human user may distinguish each image from surrounding images. Preferably, at least one of the challenge images is associated with a correct response to the challenge instruction. Preferably, at least one of the challenge images is associated with an incorrect response to the challenge instruction. Even more preferably, one of the images is associated with a correct response to the challenge instruction, and a plurality of the images are associated with an incorrect response to the challenge instruction. Preferably, the challenge instruction includes a direction for the user to select one or more of the challenge elements. Preferably, the challenge instruction includes a direction for the user to move one or more of the challenge elements. Preferably, the challenge instruction includes a direction for the user to manipulate one or more of the challenge elements.

In one embodiment, a central grid position of the grid is blank, a plurality of the images represents a male person, and one of the images represents a female person. In this embodiment, a correct response to the challenge instruction involves moving the female person to the central grid position, and an incorrect response involves moving one of the male persons to the central grid position.

Preferably, the activity elements include a plurality of visual components in the form of activity images configured in a grid formed at least in part by the plurality of activity images. Preferably, the activity instruction requests that a favourite activity image be moved to a central grid position. For example each of the plurality of images may include a different make of car, and the activity instruction is to select a favourite make of car.

Preferably, the challenge elements include a plurality of audio components in the form of challenge audio clips, wherein each challenge audio clip is presented sequentially to the user. Preferably, at least one of the challenge audio clips is clips associated with a correct response to the challenge instruction. Preferably, at least one of the audio clips is associated with an incorrect response to the challenge instruction.

In one embodiment, each of the plurality of audio clips includes a sound of a human voice. Each human voice may include a distinctive quality. For example the distinctive quality may be the sound of a male person, a female person, an angry person, a sad person, an excited person, a lazy person, an old person, a young person, or the like. In this embodiment, the challenge instruction may be, for example, to press a key on a keyboard when the sound of a young person is heard.

Preferably, the activity elements include a plurality of audio components in the form of activity audio clips, wherein each activity audio clip is presented sequentially to the user. Preferably, the audio clips are songs or clips from songs, and the activity instruction is to select a favourite song.

In another form the invention resides in a system for incorporating marketing into a user authentication, including an authentication server, the authentication server including a processor coupled to a memory, the memory including program code instructions configured to cause the processor to:

send an authentication challenge for presentation to a user of a computing device, the authentication challenge including a number of challenge elements;

receive a response to the authentication challenge from the user; and send a non-authentication marketing activity for presentation to the user, the non-authentication marketing activity including a number of activity elements;

wherein the activity elements correspond with the challenge elements.

Preferably, the computing device of the user is not also the computing device that receives the response to the authentication challenge.

In another form the invention resides in a computing device for incorporating marketing into a user authentication, including a processor coupled to a memory, the memory including program code instructions configured to cause the processor to:

send an authentication challenge for presentation to a user of the computing device, the authentication challenge including a number of challenge elements;

receive a response to the authentication challenge from the user;

send a non-authentication marketing activity for presentation to the user, the non-authentication marketing activity including a number of activity elements;

wherein the activity elements correspond with the challenge elements.

Preferably, the authentication challenge is encrypted before being sent to the user.

Preferably, the challenge elements are encrypted before being sent to the user.

Preferably, the authentication challenge is decrypted before being presented to the user.

Preferably, the challenge elements are decrypted before being presented to the user.

Preferably, if a time between sending a key to decrypt the encrypted challenge elements and receiving the response to the authentication challenge is longer than a pre-determined time, the response to the authentication challenge is determined to be an incorrect response.

BRIEF DESCRIPTION OF THE DRAWINGS

An embodiment of the invention will be described with reference to the accompanying drawings in which:

FIG. 3 illustrates a screenshot of an authentication challenge according to an embodiment of the present invention;

FIG. 4 illustrates a screenshot of a non-authentication activity according to an embodiment of the present invention;

FIG. 14 illustrates a flow chart of a method for incorporating marketing into a user authentication according to an embodiment of the present invention;

FIG. 17 illustrates a flow chart of a method for incorporating marketing into a user authentication according to an embodiment of the present invention;

FIG. 19 illustrates a flow chart of a method for incorporating marketing into a user authentication according to an embodiment of the present invention;

FIG. 21 illustrates a flow chart of a method for incorporating marketing into a user authentication according to an embodiment of the present invention;

FIG. 22 illustrates a flow chart of a method for incorporating marketing into a user authentication according to an embodiment of the present invention;

FIG. 23 illustrates a flow chart of a method for incorporating marketing into a user authentication according to an embodiment of the present invention;

FIG. 24 illustrates a flow chart of a method for incorporating marketing into a user authentication according to an embodiment of the present invention; and FIG. 25 illustrates a flow chart of a method for incorporating marketing into a user authentication according to an embodiment of the present invention.

DETAILED DESCRIPTION OF THE PREFERRED EMBODIMENT

Figure 1:
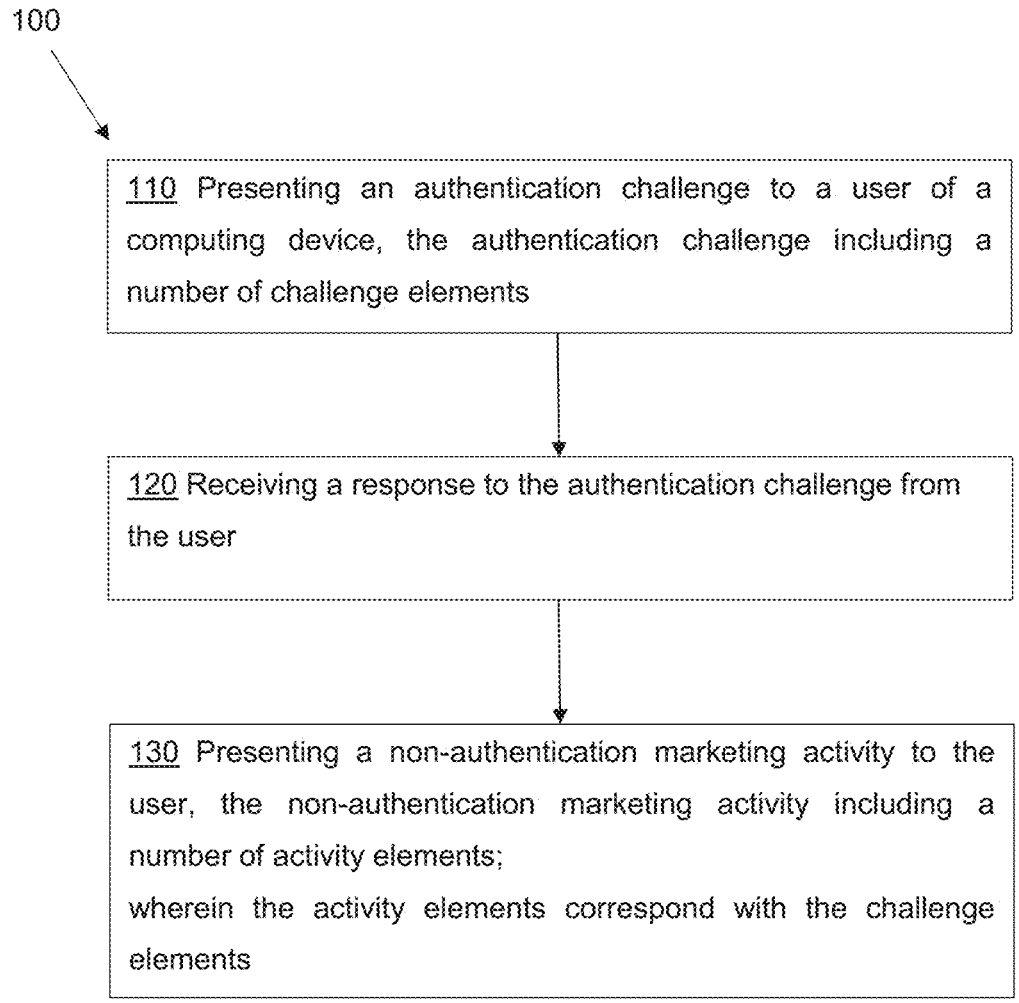
FIG. 1 illustrates a flow chart of a method for incorporating marketing into a user authentication.

Elements of the invention are illustrated in concise outline form in the drawings, showing only those specific details that are necessary to understanding the embodiments of the present invention, but so as not to clutter the disclosure with excessive detail that will be obvious to those of ordinary skill in the art in light of the present description.

In this patent specification, adjectives such as first and second, left and right, front and back, top and bottom, etc., are used solely to define one element from another element without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention. It will be appreciated that the invention may be implemented in a variety of ways, and that this description is given by way of example only.

FIG. 1 illustrates a block diagram of a method 100 for incorporating marketing into user authentication according to an embodiment of the present invention. At step 110, an authentication challenge is presented to a user of a computing device, the authentication challenge including a number of challenge elements. At step 120, a response to the authentication challenge is received from the user. At step 130, a non-authentication marketing activity is presented to the user, the non-authentication marketing activity including a number of activity elements, wherein the activity elements correspond with the challenge elements.

Embodiments of the present invention enable valuable marketing data to be either received from or provided to users in a manner that increases the likelihood that the users will be attentive and focused when receiving or providing the marketing data. That is because online users have become accustomed to concentrating on accurately responding to authentication challenges in order to promptly pass the challenges and gain access to a desired online application. Embodiments of the present invention exploit this concentration by immediately following an authentication challenge with a non-authentication marketing activity, where activity elements correspond with the immediately preceding challenge elements. Because users are already focused and practiced at accurately responding to the challenge elements, any responses provided by the users to the activity elements are more likely to be accurate and well considered. Dissemination of marketing materials or collection of user profile data can be further enhanced through the "fun" nature of challenges and marketing activities. The marketing materials also will be more strongly noticed and clearly recalled later by the users because of the focus that the authentication challenge demands. This concept is further clarified by the specific examples described below.

Furthermore, the mere fact that an authenticated user performed the non-authentication marketing activity is valuable marketing data. This is because companies and other organisations wish to pay only for real humans to view the marketing materials, and not pay where it is likely that agents have viewed the marketing materials. Because the marketing data is not recorded or transmitted until the user is authenticated, the marketing company or organisation can be assured that all marketing data they receive was generated by a real human.

In addition, the non-authentication marketing activity may be a vote, poll, or contest entry. Companies and other organisations often wish to prevent a single user from making an entry to the vote, poll, or contest multiple times. Such multiple entries may be done with the help of agents, which will be blocked by embodiments of the present invention. Such multiple entries may also be done by a human user willing to spend the time and effort to make multiple entries. Because the authentication activity increases the amount of time and effort required to make each entry, multiple entries may be reduced.

Figure 2:
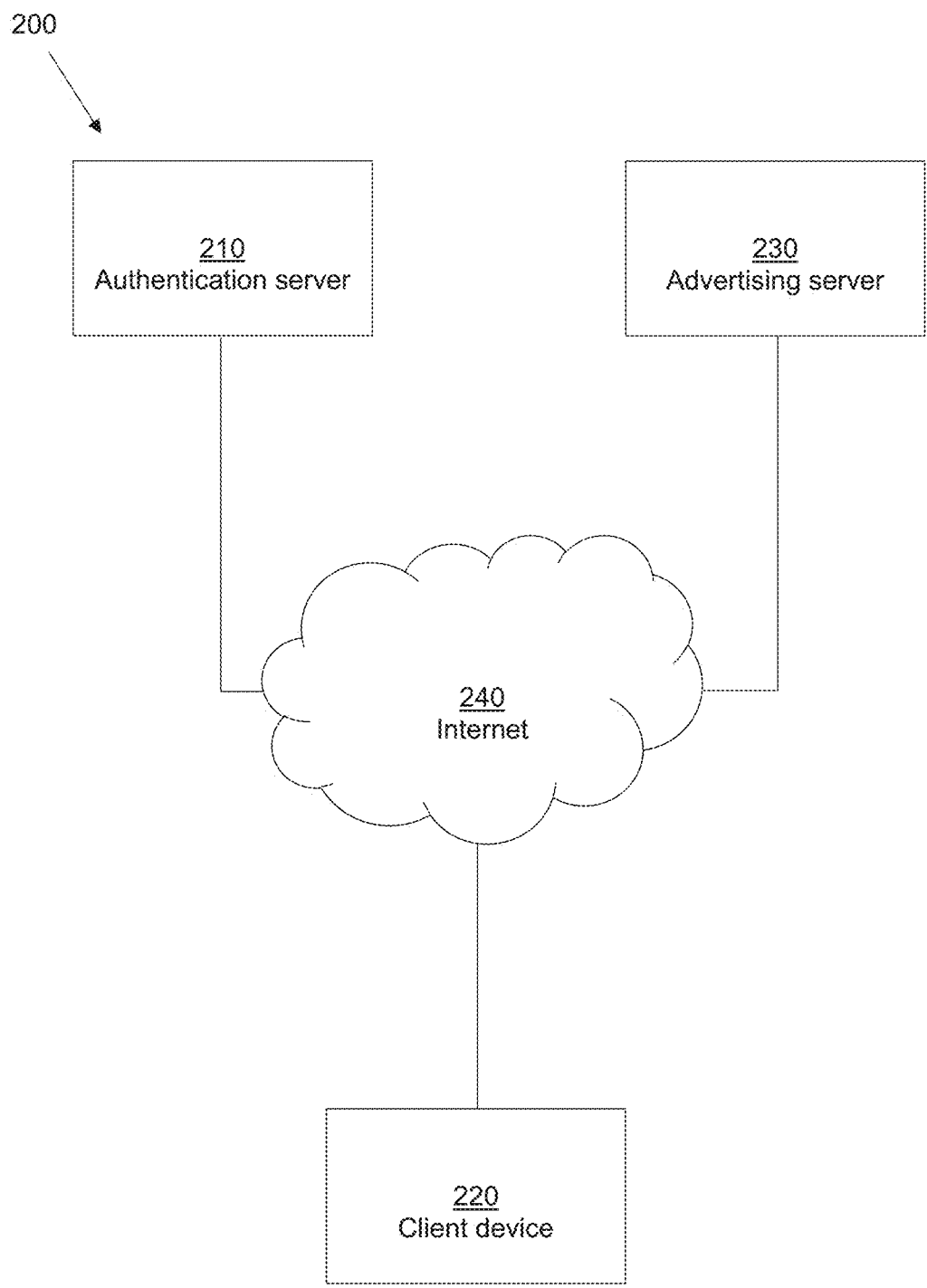
FIG. 2 illustrates a block diagram of a system for incorporating marketing into a user authentication according to an embodiment of the present invention.

FIG. 2 illustrates a block diagram of a system 200 for incorporating marketing into user authentication according to an embodiment of the present invention. The system 200 includes an authentication server 210, a client device 220 and an advertising server 230, each in communication via the Internet 240. In one embodiment, the method 100 of FIG. 2 is performed on the authentication server 210. The authentication server 210 includes a processor coupled to a memory, and the memory includes program code components configured to cause the processor to perform the method of the present invention.

According to some embodiments, each authentication challenge is relatively easy for humans to perform but relatively computationally intensive for automated computer programs such as bots or agents to perform, and some examples are provided below. However it should be appreciated that the examples do not represent all possible scenarios.

FIG. 3 illustrates a screenshot of an authentication challenge 300 presented to a user of the client device 220 according to an embodiment of the present invention. The authentication challenge 300 includes a number of challenge elements 310, and a challenge instruction 320. In this embodiment, the challenge elements 310 include a plurality of visual components in the form of challenge images 311, 312, 313, 314, 315, 316, 317, 318. The challenge images 311, 312, 313, 314, 315, 316, 317, 318 are configured spatially, and in one embodiment the challenge images 311, 312, 313, 314, 315, 316, 317, 318 are configured in a grid formed in part by the plurality of challenge images 311, 312, 313, 314, 315, 316, 317, 318. In this embodiment, a 3×3 grid is shown. Each of the challenge images 311, 312, 313, 314, 315, 316, 317 includes an image of a male person, and challenge image 318 includes an image of a female person. A central grid position 319 of the grid is blank.

In the embodiment of FIG. 3 above, the challenge images include a number of distinct images. However it should be appreciated that, the challenge images may include a single image with distinct images visible within the single image.

In this embodiment, the challenge instruction is to move the woman into the middle. That is, the challenge instruction is to move the challenge image 318 of the female person into the central grid position 319. In this embodiment, a correct response to the challenge instruction involves moving the challenge image 318 of the female person to the central grid position 319, and an incorrect response would be moving one of the other challenge images 311, 312, 313, 314, 315, 316, 317 of the male persons to the central grid position 319. Once the user has selected a desired challenge image 311, 312, 313, 314, 315, 316, 317, 318 into the central grid position 319, the authentication server 210 determines whether the response is correct or incorrect.

In some embodiments, if the user of the client device 220 provides a correct response to the authentication challenge, a non-authentication marketing activity is then presented to the user to complete. Alternatively, the non-authentication activity may be presented to the user to complete whilst the response to the authentication challenge is determined by the authentication server 210. Once the authentication challenge has been successfully completed and the non-authentication activity has been completed, the user may access the computing resource or web site.

FIG. 4 illustrates a screenshot 400 of a non-authentication marketing activity according to an embodiment of the present invention.

The non-authentication marketing activity includes a number of the activity elements 410 and an activity instruction 420.

The activity elements 410 include a plurality of visual components in the form of activity images 411, 412, 413, 414, 415, 416, 417, 418. The activity elements 410 are configured in a grid formed at least in part by the plurality of the activity images 411, 412, 413, 414, 415, 416, 417, 418. Preferably, the activity instruction requests that a favourite activity image 411, 412, 413, 414, 415, 416, 417, 418 be moved to a central grid position. For example, each of the plurality of activity images 411, 412, 413, 414, 415, 416, 417, 418 may include a different make or model of car, and the activity instruction is to "Move your favourite car to the middle". The activity images 411, 412, 413, 414, 415, 416, 417, and 418 may be provided by the advertising server 230, and once a response to the activity instruction has been made by the user, the response is sent to the advertising server 230. A response then becomes user profile data for that user, and can be used to focus subsequent marketing to that user.

For example, depending on an activity image 411, 412, 413, 414, 415, 416, 417, 418 selected by the user, the advertising server 230 or the authentication server 210 may send a banner advertisement to the client device 220, or any other suitable content such as videos which advertise products, services or events, coupons, access codes, images of commercial brands, and audio files which advertise products, services, or events, but it is not limited to such content. The content may be provided by, but not limited to, advertisers, marketing managers, promoters, entertainers, and vendors of a product or service.

In another embodiment, a response to the non-authentication marketing activity is only recorded or transmitted in response to a correct response to the authentication challenge. This prevents responses to non-authentication marketing activities being recorded until the authentication challenge has been successfully completed, and provides a higher confidence to advertisers that advertising material has been delivered to a human user.

As shown in FIGS. 3 and 4, the challenge elements 310 of the authentication challenge correspond with the activity elements 410 of the non-authentication marketing activity. That is the non-authentication marketing activity has a similar "look and feel" as the authentication challenge. In particular, the challenge elements 310 are arranged in a similar grid pattern to the activity elements 410. In particular the challenge elements 310 and the activity elements 410 are arranged in a 3×3 grid with each central grid position 319, 419 vacant for moving one of the challenge elements 310 and one of the activity elements 410 respectively.

Such correspondence between the challenge and the marketing activity can increase the accuracy and completeness of the marketing activity, because the user is already concentrating and focused on successfully passing the authentication challenge. In some embodiments, the user will not be aware that a non-authentication marketing activity is not a required element of an authentication. Thus the user will generally do his or her best to accurately and correctly respond to the non-authentication marketing activity. Thus the accuracy, completeness and value of received user profile data is increased.

Of course, given time to reflect, most users will be aware that there cannot possibly be a "right answer" to an instruction such as "Move your favourite car to the middle", and thus such an instruction is likely not part of an authentication process. However, when juxtaposed with valid authentication challenges users are likely to simply continue to focus on the non-authentication marketing activities and to respond as accurately as possible.

Furthermore, in some embodiments the challenge instruction 320 corresponds with the activity instruction 420. In particular an action in the authentication challenge corresponds with an action in the non-authentication marketing activity. In the embodiments of FIGS. 3 and 4, the action is to move something, either the woman or a favourite car, into the middle.

In some embodiments, the activity instruction 420 may be to ask the user to express a fact about the activity element selected by the user, such as "Move a car you have seen to the middle", or "Move a car you own into the middle", or "Move the car with the best safety record to the middle".

Although in the embodiment shown in FIGS. 3 and 4 a single authentication challenge and single non-authentication marketing activity was presented to the user, it should be appreciated that a plurality of authentication challenges may be presented to the user in sequence, followed by a plurality of non-authentication marketing activities in sequence. Alternatively, a plurality of challenges and marketing activities may be mixed together, such that the marketing activities must be completed in order to receive subsequent challenges that provide access to an application.

The term "marketing activity" is defined broadly according to some embodiments, and may include activities that present various types of information to a user, such as advertising information, or to activities that collect user profile data.

Further, a marketing activity may seek to obtain any type of user profile data such as customer preferences, tastes, habits, and demographic data. Furthermore, a marketing activity may simply make a user aware of a product or service in order to increase the chances that the user will later recognise and purchase or engage in the product or service. Furthermore, a marketing activity may be advantageous to a company or another organisation that implements the method according to the present invention, or the marketing activity may be advantageous to a company or another organisation different to the company or other organisation which implements the method according to the present invention.

The term "authentication" is defined broadly according to some embodiments, and may include activities that ensure that information entered into a computer, such as via a web site or computer application, is entered entirely by the normal efforts of a human user of a computing device rather than by an automated program commonly known as a 'bot or an' agent, or by a human user aided by such an automated program.

The term "corresponds" is defined broadly according to some embodiments, and may include a similarity between one of, or a plurality of authentication elements and activity elements. For example, the authentication elements and activity elements may include similar interface items, interface manipulation actions, and instructions issued to the user. For an activity element to correspond with a challenge element, the activity element embodies one or a plurality of interface elements also embodied within the challenge element.

The term "image" is defined broadly according to some embodiments, and may include a graphic element with clear boundaries and borders that set it apart from its surroundings, or a graphic element within a larger graphic element, the smaller element having an identity implied as separate from other images near to it, this separation being obvious to a typical human user.

Figure 5:
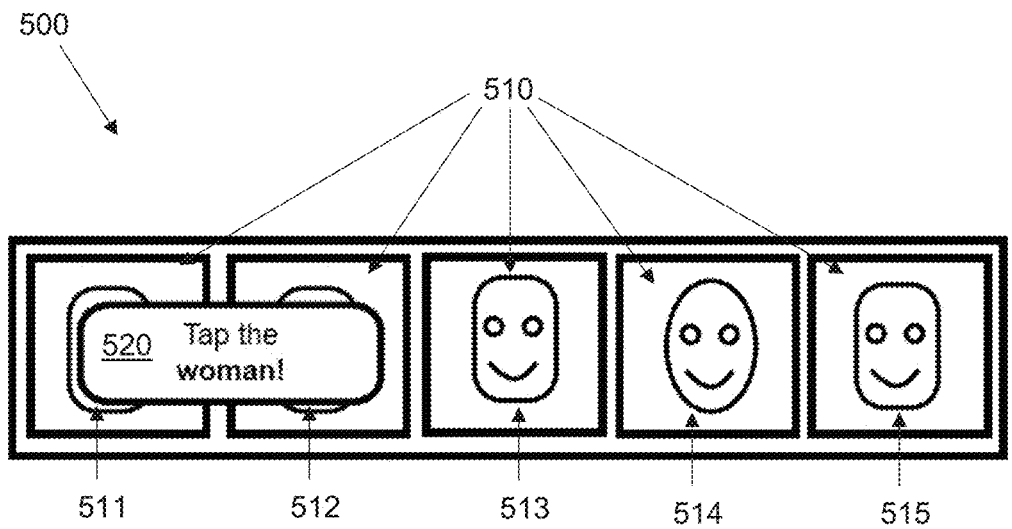
FIG. 5 illustrates a screenshot of an authentication challenge according to another embodiment of the present invention.

FIG. 5 illustrates a screenshot 500 of an authentication challenge presented to the user of the client device 220 according to another embodiment of the present invention. Similar to the embodiment of FIG. 3, the authentication challenge 500 includes challenge elements 510, and a challenge instruction 520. In this embodiment, the challenge elements include a plurality of visual components in the form of challenge images 511, 512, 513, 514, 515. The challenge images 511, 512, 513, 514, 515 are configured in a row formed by the plurality of challenge images 511, 512, 513, 514, 515. Each of the challenge images 511, 512, 513, 515, includes an image of a face of a male person, and challenge image 514 includes an image of a face of a female person.

In this embodiment, it is assumed that the authentication challenge is presented to the user on a client device 210 with a touch screen, such as a tablet computer. Thus the challenge instruction is to tap the woman. In this embodiment, a correct response to the challenge instruction involves tapping the challenge image 514 of the face of the female person, and an incorrect response would be tapping one of the other challenge images 511, 512, 513, 515 of a face of a male person. Once the user has selected a desired challenge image 511, 512, 513, 514, 515 the authentication server 210 determines whether the response is correct or incorrect.

In some embodiments, if the user of the client device 220 provides a correct response to the authentication challenge, a non-authentication marketing activity is presented to the user to complete. Alternatively, the non-authentication marketing activity is presented to the user before the response to the authentication challenge is determined by the authentication server 210. In some embodiments, the user's selection during the non-authentication marketing activity is not sent to the advertising server 230 until a correct response to the authentication challenge is received.

Similarly, in some embodiments, if the user of the client device 220 provides an incorrect response to the authentication challenge, a further authentication challenge may be presented to the user to complete.

Figure 6:
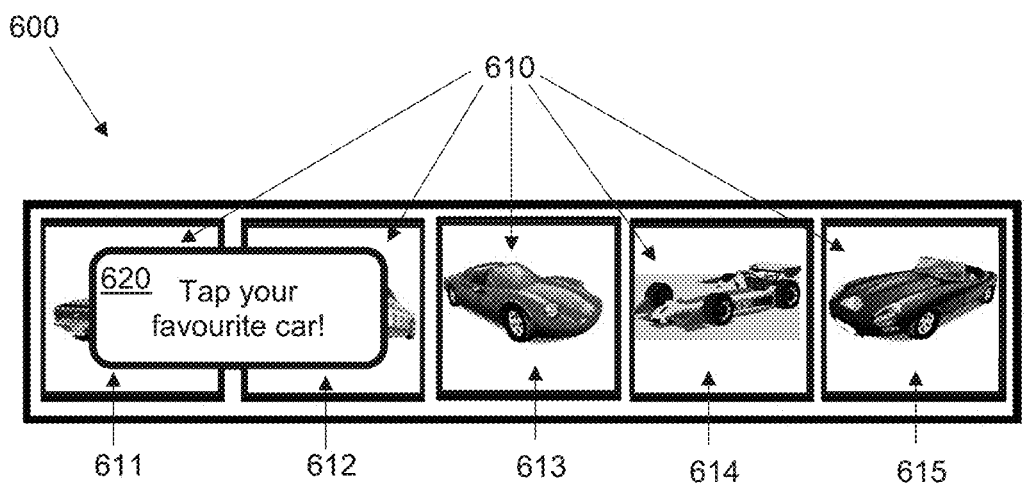
FIG. 6 illustrates a screenshot of a non-authentication marketing activity according to another embodiment of the present invention.

FIG. 6 illustrates a screenshot 600 of a non-authentication marketing activity according to another embodiment of the present invention.

The non-authentication marketing activity includes a number of the activity elements 610. The activity elements 610 include a plurality of visual components in the form of activity images 611, 612, 613, 614, 615. The activity elements 610 are configured in a row formed by the plurality of the activity images 611, 612, 613, 614, 615. In this embodiment, the activity instruction 620 requests that a favourite activity image be tapped. For example each of the plurality of activity images 611, 612, 613, 614, 615, may include a different make or model of car, and the activity instruction is to tap on the car that the user likes best. The activity images 611, 612, 613, 614, 615 may be provided by the advertising server 230, and once a response to the activity instruction has been made by the user, the user's response is sent to the advertising server 230.

As shown in FIGS. 5 and 6, the challenge elements 510 of the authentication challenge correspond with the activity elements 610 of the non-authentication marketing activity. As shown, an arrangement of the challenge elements 510 corresponds with an arrangement of the activity elements

610. In particular, the challenge elements 310 are arranged in a similar format to the activity elements 410. That is the challenge elements 510 and the activity elements 610 are arranged in a row of five challenge elements 510 or activity elements 610.

Furthermore, in some embodiments the challenge instruction 520 corresponds with the activity instruction 620. In particular an action in the authentication challenge corresponds with an action in the non-authentication marketing activity. In the embodiments of FIGS. 5 and 6, the action is to tap something, either the woman or a favourite car. Those skilled in the art will appreciate that the number of variations and examples of similar corresponding authentication challenges and non-authentication marketing activities is essentially unlimited.

Figure 7:
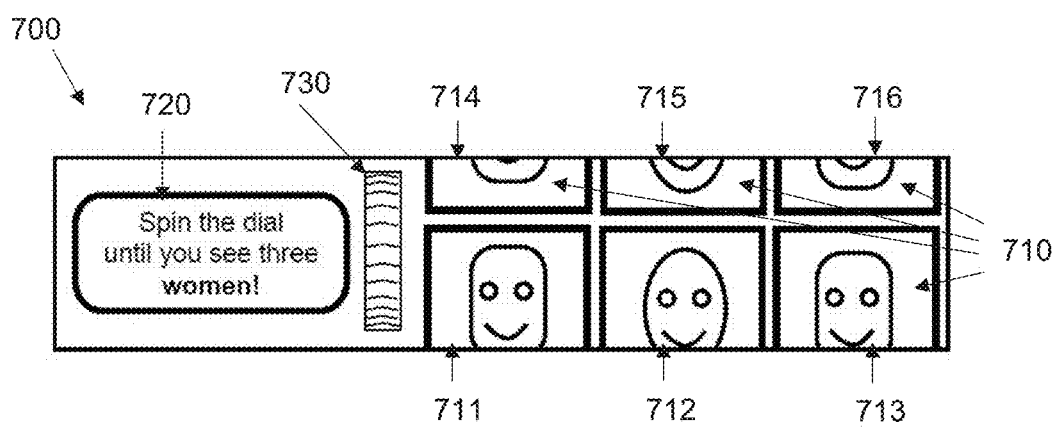
FIG. 7 illustrates a screenshot of an authentication challenge according to another embodiment of the present invention.

FIG. 7 illustrates a screenshot 700 of an authentication challenge presented to the user of the client device 220 according to yet another embodiment of the present invention. Similar to the embodiments shown in FIGS. 3 and 5, the authentication challenge includes challenge elements 710, and a challenge instruction 720. In this embodiment, the challenge elements include a plurality of visual components in the form of challenge images 711, 712, 713, 714, 715, 716. The challenge images 711, 712, 713, 714, 715, 716 are configured on a reel (similar to a reel of a gaming machine) by the plurality of challenge images 711, 712, 713, 714, 715, 716. Each of the challenge images 711, 713, 714, 715, 716 includes an image of a male person, and each of challenge images 712, 715 include an image of a female person. Although only two rows of challenge images 710 are shown, it should be appreciated that the reel may include any suitable number of rows that make up the reel. The reel may be rotated by spinning dial 730.

In this embodiment, the challenge instruction is to "spin the dial until you see three women". In this embodiment, a correct response to the challenge instruction 720 involves dragging the dial 730 (either with a mouse or a finger in the case of a touch screen) until a row of challenge images 710 includes images of three females, and an incorrect response would be if any of the challenge images 710 include an image of a male. Once the user has moved the dial to the desired position, the authentication server 210 determines whether the response is correct or incorrect.

Although not shown, a corresponding non-authentication marketing activity then may be presented to the user of the client device 220. The corresponding non-authentication marketing activity would have a similar look and feel to the authentication challenge presented in FIG. 7, and instead of a challenge image being shown, activity images (similar to FIG. 6) would be shown.

Furthermore, in some embodiments, an activity instruction may ask the user to express one of a range of opinions. For example, referring to FIG. 7, the activity instruction may be to "spin the dial to show how you feel about football", and the images on the dial may include a range of statements from "I hate football" to "I don't care about football" to "I love football".

Figure 8:
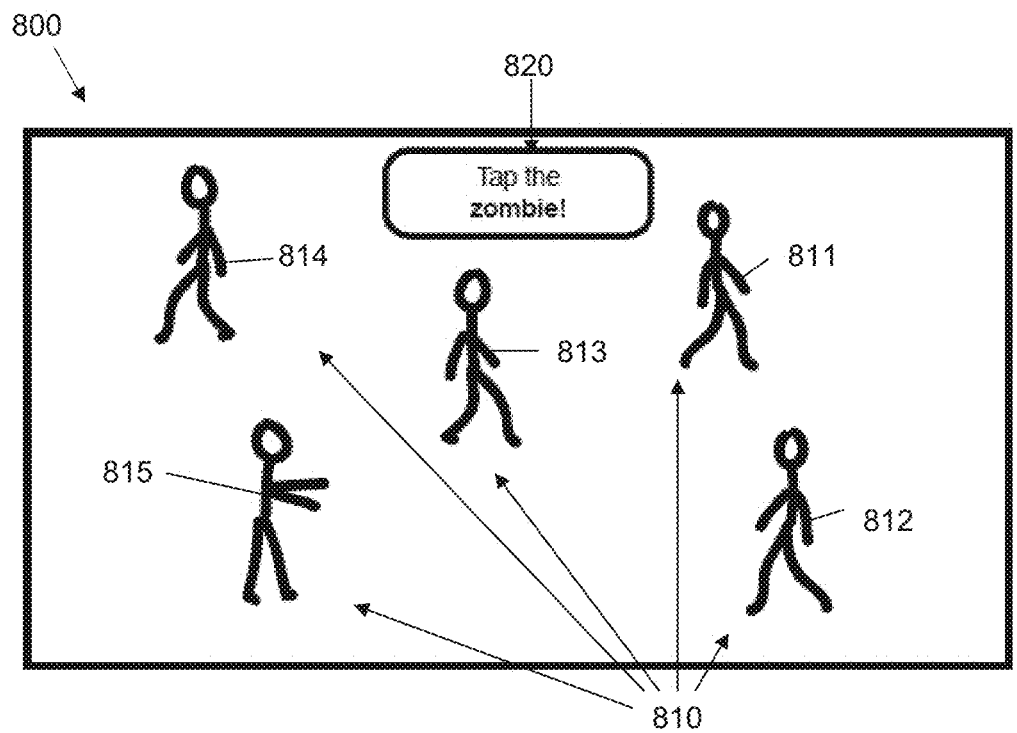
FIG. 8 illustrates a screenshot of an authentication challenge according to another embodiment of the present invention.

FIG. 8 illustrates a screenshot 800 of an authentication challenge presented to the user of the client device 220 according to yet another embodiment of the present invention. Similar to previous embodiments, the authentication challenge includes a number of challenge elements 810, and a challenge instruction 820. In this embodiment, the challenge elements 810 form an animated video, and the challenge elements may include a number of challenge animations 811, 812, 813, 814, 815 which depict people walking. One of the challenge animations 815 depicts a zombie walking, i.e. an image of a person walking in a clumsy and unnatural manner, and the challenge instruction 820 is to select "the zombie". In this example, the user selects a point within the animated video, for example by touching or clicking an area of the screen. To be deemed a correct response, a distance from a point to a correct challenge animation must be smaller than a distance from a point to any other challenge animation within the animated video.

Although not shown, a corresponding non-authentication marketing activity then may be presented to the user of the client device 220. The corresponding non-authentication marketing activity may have a similar look and feel to the authentication challenge presented in FIG. 8, and instead of a challenge image being shown, activity animations may be shown. For example, the challenge animations may depict people walking around, each one in a different dress, and the activity instruction is to select "the dress you like best".

Figure 9:
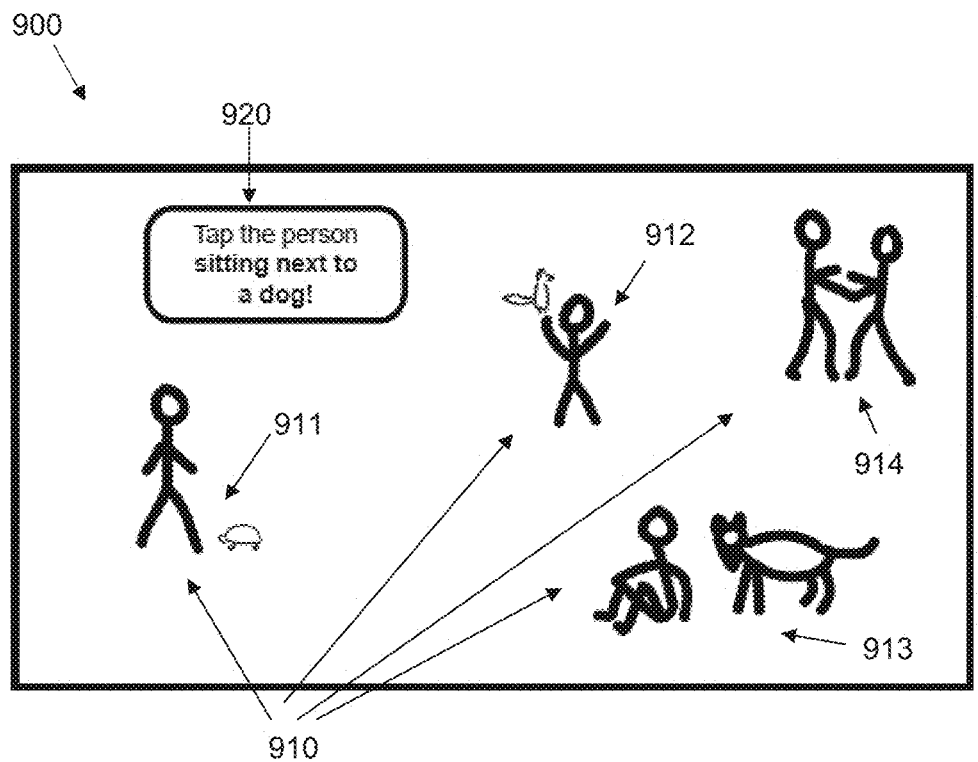
FIG. 9 illustrates a screenshot of an authentication challenge according to another embodiment of the present invention.

FIG. 9 illustrates a screenshot 900 of an authentication challenge presented to the user of the client device 220 according to yet another embodiment of the present invention. Similar to previous embodiments, the authentication challenge includes a number of challenge elements 910, and a challenge instruction 920. In the embodiment, the challenge elements 910 form an entire single image, and the entire single image is seamless, and the challenge elements 910 include distinct images rendered as part of the entire single image. In this embodiment, the challenge elements 910 include a number of challenge images 911, 912, 913, 914 in the form of people, objects and animals rendered as part of the entire single image. Each challenge image 911, 912, 913, 914 depicts a different scenario. Challenge image 911 depicts a man standing next to a tortoise. Challenge image 912 depicts a woman standing with a bird on her arm. Challenge image 913 depicts a stick man sitting down next to a dog, and challenge image 914 depicts a man and a woman dancing. In this embodiment, the challenge instruction is to tap the person sitting next to a dog. Thus a correct response is to tap on image 913.

Figure 10:
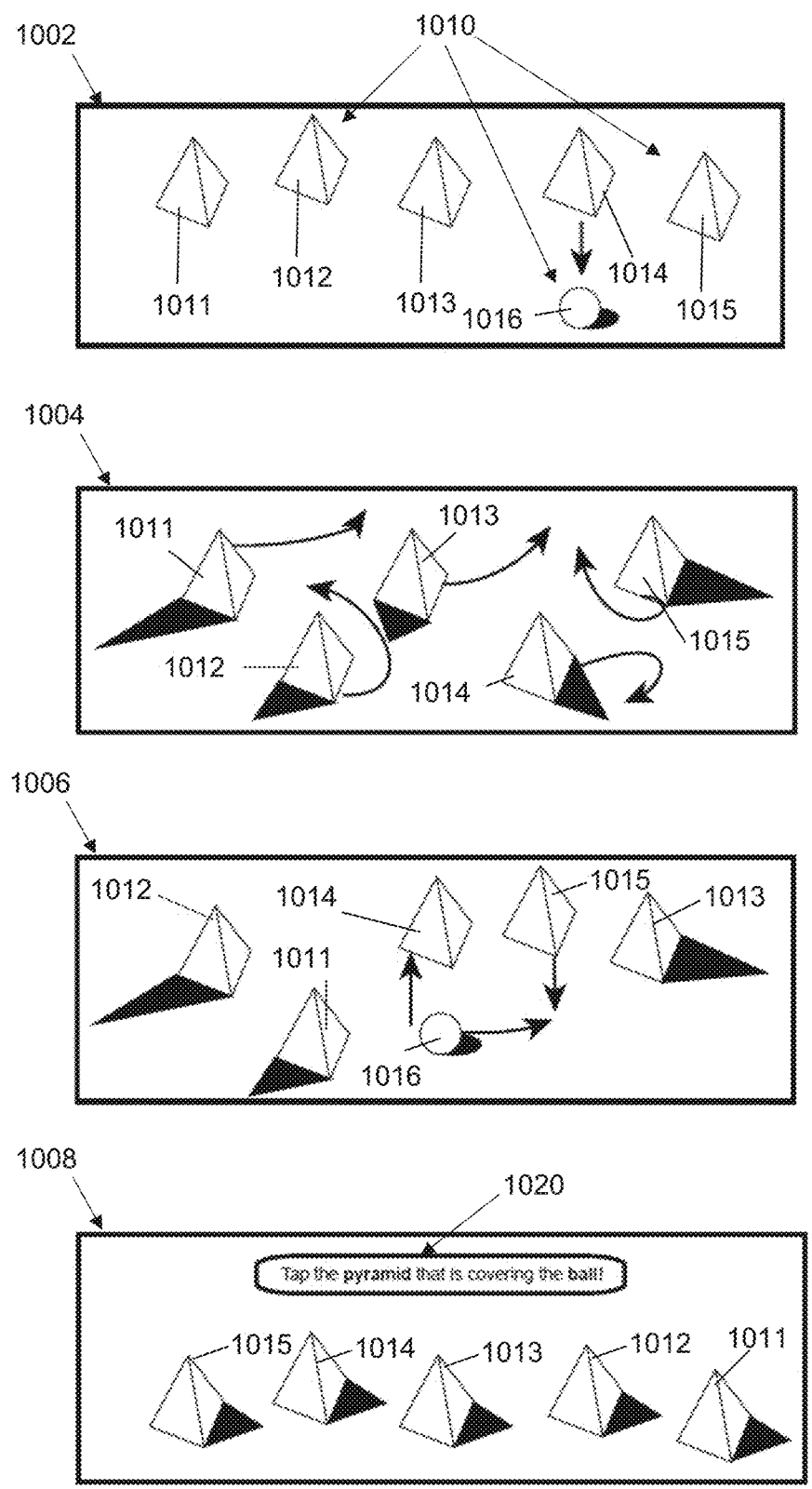
FIG. 10 illustrates a screenshot of an authentication challenge according to another embodiment of the present invention.

FIG. 10 illustrates a number of animated sequences 1002, 1004, 1006, 1008 of an authentication challenge presented to the user of the client device 220 according to yet another embodiment of the present invention. Similar to previous embodiments, the authentication challenge includes a number of challenge elements 1010, and, at an end of a chain of animated sequences, an authentication instruction 1020. In this embodiment, the challenge element 1010 is an animation of a game commonly known as thimblerig, the shell game or three shells and a pea. The challenge elements 1010 include an animation of a number of hollow pyramids 1011, 1012, 1013, 1014, 1015 and a ball 1016. The animation is rendered by authentication server 220, which randomly decides which pyramid covers the ball at different times, how the pyramids move, and what pyramid is covering the ball at the end of the chain of the animated sequences.

In a first animated sequence 1002, one of the pyramids 1011, 1012, 1013, 1014, 1015 is positioned over the ball 1016 in view of the user. In this case, pyramid 1014 is positioned over the ball 1016.

In a second animated sequence 1004 the pyramids 1011, 1012, 1013, 1014, 1015 are randomly repositioned, slow enough so that a human user watching the authentication challenge can solve the authentication challenge.

In one embodiment, as shown in a third animated sequence 1006, the ball 1016 is moved from being under pyramid 1014 to being under pyramid 1015, in view of the user.

In a fourth animated sequence 1008, movement of the pyramids 1011, 1012, 1013, 1014, 1015 is randomly stopped, and the challenge instruction 1020 is presented to the user. In this embodiment, the challenge instruction 1020 is to tap the pyramid 1011, 1012, 1013, 1014, 1015 that covers the ball 1016. In this case a correct response would be a user tapping on pyramid 1015.

In some embodiments, the animation may be rendered to include shadows to make the animation more realistic, and to make the authentication challenge more computationally intensive for an agent or bot to solve. In addition, a virtual camera position may be changed to change a viewing perspective. For example, the virtual camera position may be gradually moved from an aerial view to a ground view, or 'flown' around the challenge elements 1010.

In some embodiments, the challenge elements may include animations, images or videos that depict various scenarios that a typical human would be able to decipher, but would be difficult for an agent or bot. For example, challenge elements may include presenting animations of models which a human would consider indicative of a zombie, an intoxicated person, a person that is a bad dancer, a person in a comfortable position, a person in an uncomfortable position or different types of animals. In these scenarios the challenge instruction may describe one of the presented animations, images or videos for the user to select. An act of selecting an image may comprise the user indicating a point within an entire image. To be deemed a correct response, a distance from a point to a correct element must be smaller than a distance from a point to any other element within the entire image.

In the case of challenge images that are composed of two dimensional images, each of the challenge images may be created from a different aspect of a virtual three dimensional object. For example, each of the challenge images may be created from a virtual camera viewing the three dimensional object from a different angle or distance. In another example, some of the features of the challenge images may be altered, for example skin tones, a size or shape of features of a person such as a nose, or a mouth etc. In other examples, the images may be altered using virtual light sources in order to change lighting effects and shadowing. Altering such an image helps to make it more difficult for an agent to compare challenge elements with previously presented challenge elements.

Other challenge elements may include images that appear to be different distances away from a virtual camera, and the user may be presented with a challenge instruction to select a closest image, or the furthest image. In yet another example, the challenge elements may include a pile of overlapping images, and the user may be presented with a challenge instruction to select or attend to an image at the bottom of the pile or at the top of the pile.

In yet another embodiment, the challenge elements may include a plurality of panels, each panel containing an image, as in a comic strip. One sequence of these panels portrays a sensible story to a typical human observer, and every other possible sequence of panels does not portray a sensible story to a typical human observer. In this scenario, the challenge instruction is to rearrange the panels to make a sensible story.

In yet another embodiment, the challenge elements may include an image of an object, and the challenge instruction is to rotate the object so that it appears to be upright.

In still another embodiment, the challenge elements may include a number of virtual objects which are either still or in motion, and the challenge instruction is to select a bouncing virtual object.

Although in the authentication challenges and non-authentication marketing activities described above the challenge elements and activity elements are visual, it should be appreciated that the challenge elements and activity elements may also include a number of audio components.

In one embodiment, the challenge elements may include a plurality of audio components in the form of challenge audio clips, wherein each challenge audio clip is presented sequentially to the user. At least one of the challenge audio clips is associated with a correct response to the challenge instruction, and at least one of the audio clips is associated with an incorrect response to the challenge instruction.

In one embodiment, each of the plurality of audio clips includes a sound of a human voice, each human voice including a distinctive quality. For example the distinctive quality may be a sound that the user perceives the human voice to be. For example, the distinctive quality may be the sound of a male person, a female person, an angry person, a sad person, an excited person, a lazy person, an old person, a young person, or the like. In this embodiment, the challenge instruction may be, for example, to press a key on a keyboard when the young person is heard. In some embodiments, the user may respond by speaking. Although in this example each sound may include a different distinctive quality, it should be appreciated that some of the sounds may include a same distinctive quality.

Once a correct response to the authentication challenge has been provided by the user, a non-authentication marketing activity is presented to the user which corresponds with the authentication challenge. Similar to the authentication challenge, the non-authentication marketing activity includes activity elements. The activity elements may include a plurality of audio components in the form of activity audio clips, wherein each activity audio clip is presented sequentially to the user. For example, the audio clips may be songs or dips from songs, and the activity instruction is to select a favourite song. In another embodiment, the audio clip may be a series of ringtones, and the activity instruction may state "After you hear a ringtone you like, say YES."

The authentication challenges described above may be made more computationally intensive for an agent to solve by adding random snow, noise, distortion, occlusion, decolourisation, or jitter to the challenge elements. In another example, images or sounds may be made more computationally intensive by overlapping the images or sounds.

In some embodiments one or more of the challenge elements is encrypted by the authentication server 210 before being sent to the client device 220. In another embodiment, the authentication challenge may be encrypted before being sent to the client device 220. In one embodiment, a decryption key is generated for the one or more challenge elements and/or the authentication challenge, which is sent to the client device 220 to decrypt the one or more challenge elements and/or the authentication challenge. The decryption key is sent separately to the encrypted authentication challenge. In some embodiments, a time to complete the authentication challenge is limited and predefined. For example, the time to complete the authentication challenge may be limited to ten seconds from a time that the authentication server 210 sends the decryption key to the client device 220.

In yet another embodiment, each of the challenge elements may be assigned an index identifier which is stored in a table of assigned index identifiers on the authentication server 210. When a response to the authentication challenge is received by the authentication server 210, the index identifier is compared with the table of index identifiers in order to ensure that it is valid. Each index identifier is one of a very large number of possible identifiers to reduce a likelihood of the assigned index number being predicted by an agent.

In some embodiments, a plurality of authentication challenges may be presented to the user. For example, a difficulty, i.e. a level of computation intensity, of the authentication challenges may be increased in response to the instructions of a system operator, or in automatic response to a behaviour of the user in the past. For example in the embodiment shown in FIG. 3, successive authentication challenges may include a greater number of challenge images. As the number of challenge images increases, a number of non-authentication marketing activities may include a smaller number of activity images. In this way a total number of actions the user performs may remain the same regardless of the difficulty.

In some embodiments, a reward may be awarded to the user according to a way in which the user completed the authentication challenge and/or non-authentication marketing activity. For example, the shorter the amount of time to complete the authentication challenge and/or non-authentication marketing activity, the higher the reward. For example, the reward may include a number of stars added to a record for the user. The user accumulates the stars with each authentication challenge. The stars may be accumulated as the user operates different client devices 220, or the same client device 220 at multiple times.

In some embodiments, the user may receive more rewards by choosing to perform more non-authentication marketing activities than a minimum necessary. For example, one choice the user may make during the non-authentication marketing activity, is to engage in a new non-authentication marketing activity. For making that choice, the user may be awarded a reward higher than a user not making that choice.

In some embodiments, the user may participate in special activities once the user has accumulated a pre-determined number of rewards. For example, if the user accumulates 100 stars, the user may choose to view marketing materials, to give a reward to a third party such as a charity or other organisation, or for the user to receive the reward.

In some embodiments, the user may provide permission, for example through options, to participate in other marketing activities, such as allowing the user's identity to be used to determine which marketing materials the user receives, for which the user may be awarded further rewards.

In some embodiments, the user may be invited to participate in an activity in which other participants of the activity are users who have provided similar responses in the non-authentication marketing activities. In this way users may be formed into affinity groups with similar interests. The affinity groups may include groups for the purpose of socialising, dating, group purchases, inclusion in a common interest group, or similar purposes.

Figure 11:
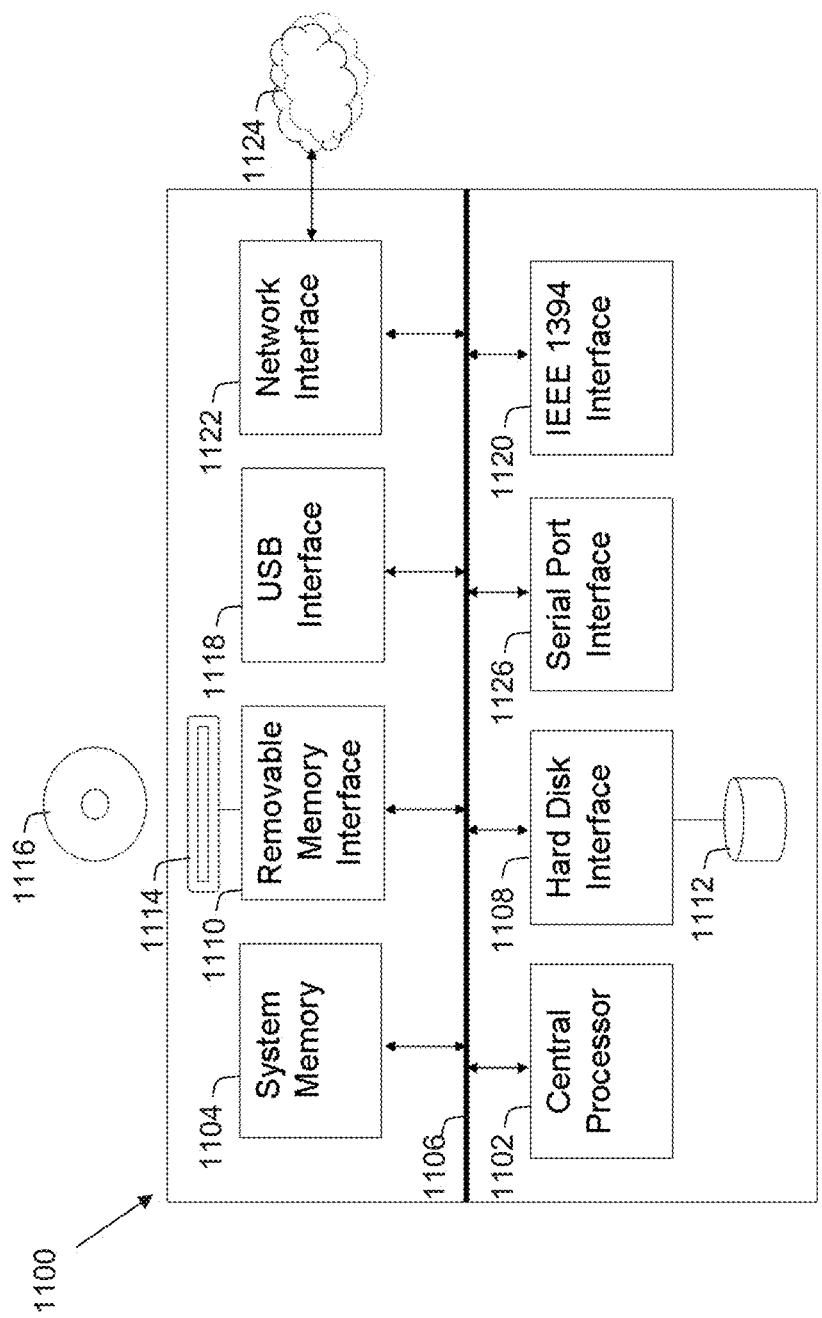
FIG. 11 diagrammatically illustrates a computing device for performing the method of the present invention according to an embodiment of the present invention.

As previously described, the present invention may be implemented using the system 200 of FIG. 2. However it should be appreciated that the present invention may also be performed on a stand-alone computing device such as a personal computer, laptop, tablet or smartphone which is not connected to the Internet. FIG. 11 diagrammatically illustrates a computing device 1100 for performing the method of the present invention, such as the authentication server 210, the client device 220 or the advertising server 230, according to an embodiment of the present invention. Similarly, the method 100 of FIG. 1 can be implemented using the computing device 1100.

The computing device 1100 includes a central processor 1102, a system memory 1104 and a system bus 1106 that couples various system components, including coupling the system memory 1104 to the central processor 1102. The system bus 1106 may be any of several types of bus structures including a memory bus or memory controller, a peripheral bus, and a local bus using any of a variety of bus architectures. The structure of system memory 1104 is well known to those skilled in the art and may include a basic input/output system (BIOS) stored in a read only memory (ROM) and one or more program modules such as operating systems, application programs and program data stored in random access memory (RAM).

The computing device 1100 can also include a variety of interface units and drives for reading and writing data.

In particular, the computing device 1100 includes a hard disk interface 1108 and a removable memory interface 1110, respectively coupling a hard disk drive 1112 and a removable memory drive 1114 to the system bus 1106. Examples of removable memory drives 1114 include magnetic disk drives and optical disk drives. The drives and their associated computer-readable media, such as a Digital Versatile Disc (DVD) 1116 provide non-volatile storage of computer readable instructions, data structures, program modules and other data for the computer system 1100. A single hard disk drive 1112 and a single removable memory drive 1114 are shown for illustration purposes only and with the understanding that the computing device 1100 can include several similar drives. Furthermore, the computing device 1100 can include drives for interfacing with other types of computer readable media.

The computing device 1100 may include additional interfaces for connecting devices to the system bus 1106. FIG. 11 shows a universal serial bus (USB) interface 1118 which may be used to couple a device to the system bus 1106. For example, an IEEE 1394 interface 1120 may be used to couple additional devices to the computing device 1100.

The computing device 1100 can operate in a networked environment using logical connections to one or more remote computers or other devices, such as a server, a router, a network personal computer, a peer device or other common network node, a wireless telephone or wireless personal digital assistant. The computing device 1100 includes a network interface 1122 that couples the system bus 1106 to a local area network (LAN) 1124. Networking environments are commonplace in offices, enterprise-wide computer networks and home computer systems.

A wide area network (WAN), such as the Internet, can also be accessed by the computing device 1100, for example via a modem unit connected to a serial port interface 1126 or via the LAN 1124. Transmission of data can be performed using the LAN 1124, the WAN, or a combination thereof.

It will be appreciated that the network connections shown and described are exemplary and other ways of establishing a communications link between computers can be used. The existence of any of various well-known protocols, such as TCP/IP, Frame Relay, Ethernet, FTP, HTTP and the like, is presumed, and the computing device 1100 can be operated in a client-server configuration to permit a user to retrieve data from, for example, a web-based server.

The operation of the computing device 1100 can be controlled by a variety of different program modules.

Examples of program modules are routines, programs, objects, components, and data structures that perform particular tasks or implement particular abstract data types. The present invention may also be practiced with other computer system configurations, including hand-held devices, multi-processor systems, microprocessor-based or programmable consumer electronics, network PCs, minicomputers, mainframe computers, personal digital assistants and the like. Furthermore, the present invention may also be practiced with other methods of visual output from the computer system, including a virtual reality display, a projection of output into an eye of a user, a projection of output onto a surface within the view of the user, such as eyeglasses or another surface close to the eye. Furthermore, the present invention may also be practiced with other methods of user input to the computer system, including detection of a movement of a limb, a digit, an eye, a head, or a body of a user, detection of a thought by a user, or detection of a mental feature of a users intention. Furthermore, the invention may also be practiced in distributed computing environments where tasks are performed by remote processing devices that are linked through a communications network. In a distributed computing environment, program modules may be located in both local and remote memory storage devices.

Figure 12:
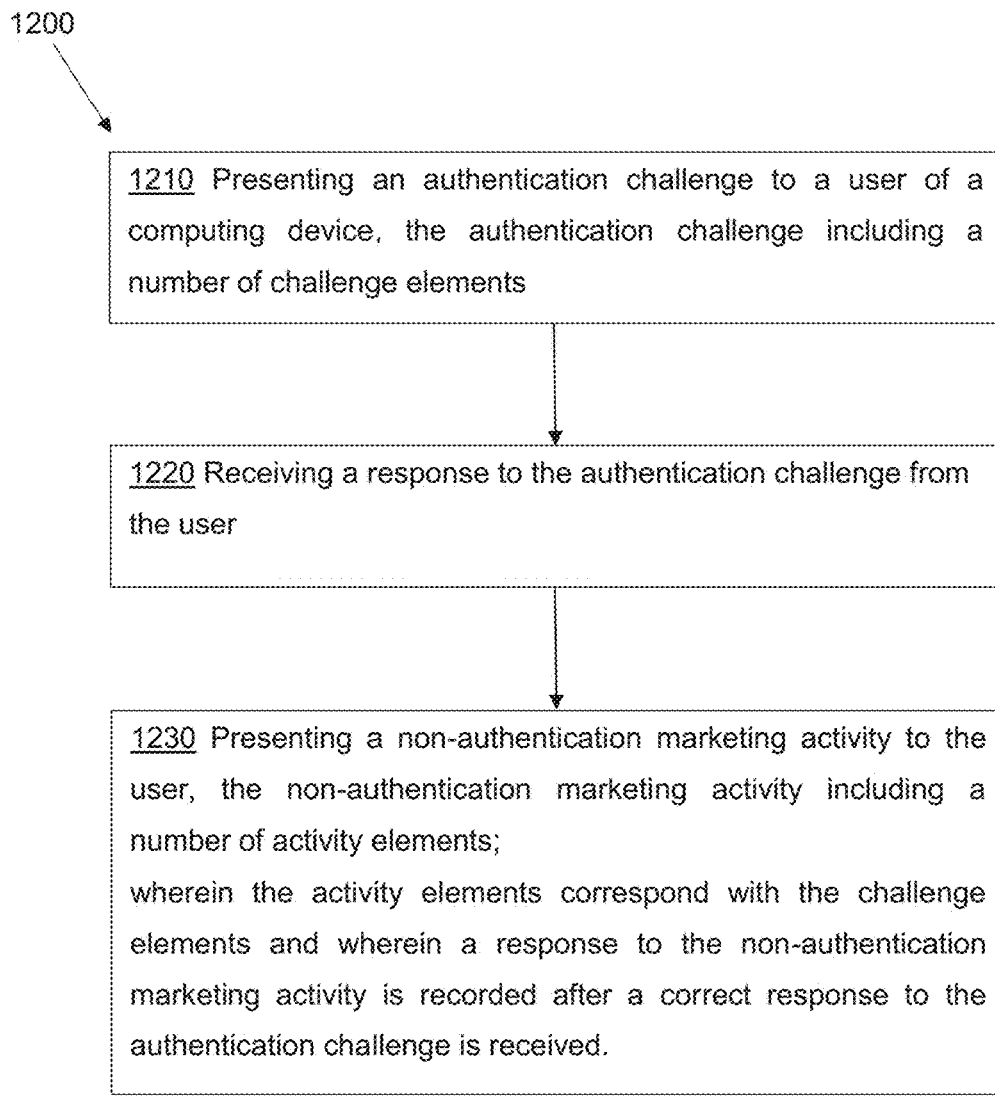
FIG. 12 illustrates a flow chart of a method for incorporating marketing into a user authentication according to an embodiment of the present invention.

FIG. 12 illustrates a block diagram of a method 1200 for incorporating marketing into user authentication according to an embodiment of the present invention. At step 1210, an authentication challenge is presented to a user of a computing device, the authentication challenge including a number of challenge elements. At step 1220, a response to the authentication challenge is received from the user. At step 1230, a non-authentication marketing activity is presented to the user, the non-authentication marketing activity including a number of activity elements, wherein the activity elements correspond with the challenge elements and a response to the non-authentication marketing activity is recorded after a correct response to the authentication challenge is received.

Figure 13:
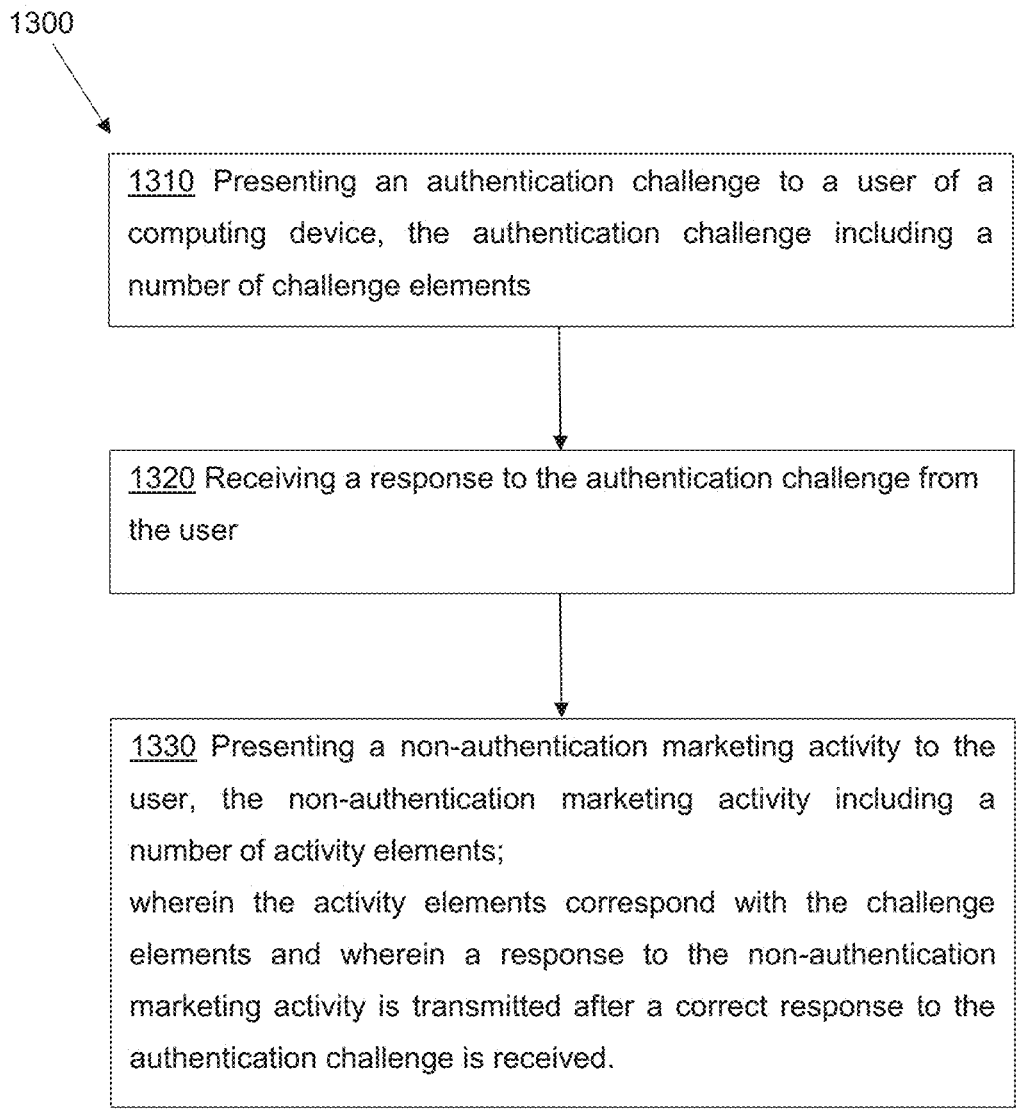
FIG. 13 illustrates a flow chart of a method for incorporating marketing into a user authentication according to an embodiment of the present invention.

FIG. 13 illustrates a block diagram of a method 1300 for incorporating marketing into user authentication according to an embodiment of the present invention. At step 1310, an authentication challenge is presented to a user of a computing device, the authentication challenge including a number of challenge elements. At step 1320, a response to the authentication challenge is received from the user. At step 1330, a non-authentication marketing activity is presented to the user, the non-authentication marketing activity including a number of activity elements, wherein the activity elements correspond with the challenge elements and a response to the non-authentication marketing activity is transmitted after a correct response to the authentication challenge is received.

FIG. 14 illustrates a block diagram of a method 1400 for incorporating marketing into user authentication according to an embodiment of the present invention. At step 1410, an authentication challenge is presented to a user of a computing device, the authentication challenge including a number of challenge elements. At step 1420, a response to the authentication challenge is received from the user. At step 1430, a non-authentication marketing activity is presented to the user, the non-authentication marketing activity including a number of activity elements, wherein the activity elements correspond with the challenge elements and the non-authentication marketing activity is presented to the user after a correct response to the authentication challenge is received.

Figure 15:
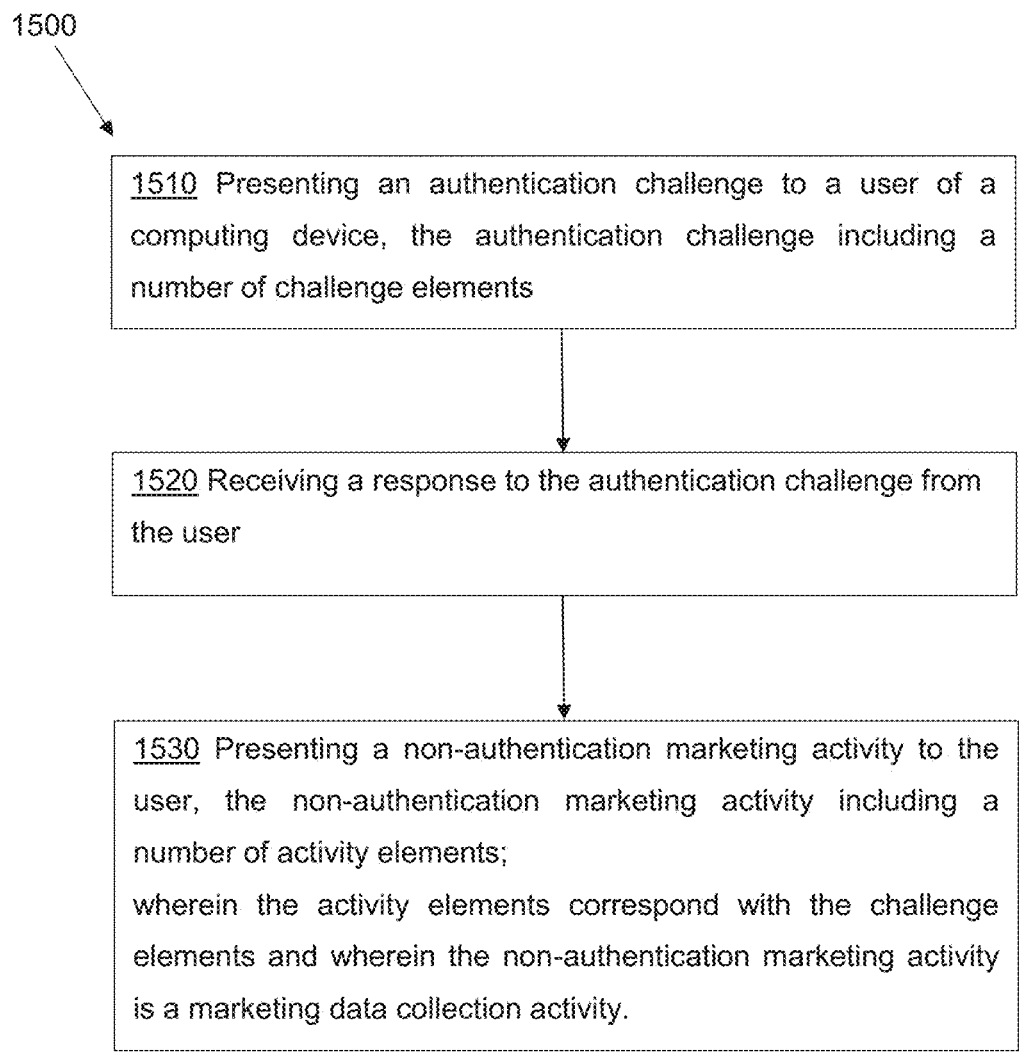
FIG. 15 illustrates a flow chart of a method for incorporating marketing into a user authentication according to an embodiment of the present invention.

FIG. 15 illustrates a block diagram of a method 1500 for incorporating marketing into user authentication according to an embodiment of the present invention. At step 1510, an authentication challenge is presented to a user of a computing device, the authentication challenge including a number of challenge elements. At step 1520, a response to the authentication challenge is received from the user. At step 1530, a non-authentication marketing activity is presented to the user, the non-authentication marketing activity including a number of activity elements, wherein the activity elements correspond with the challenge elements and the non-authentication marketing activity is a marketing data collection activity.

Figure 16:
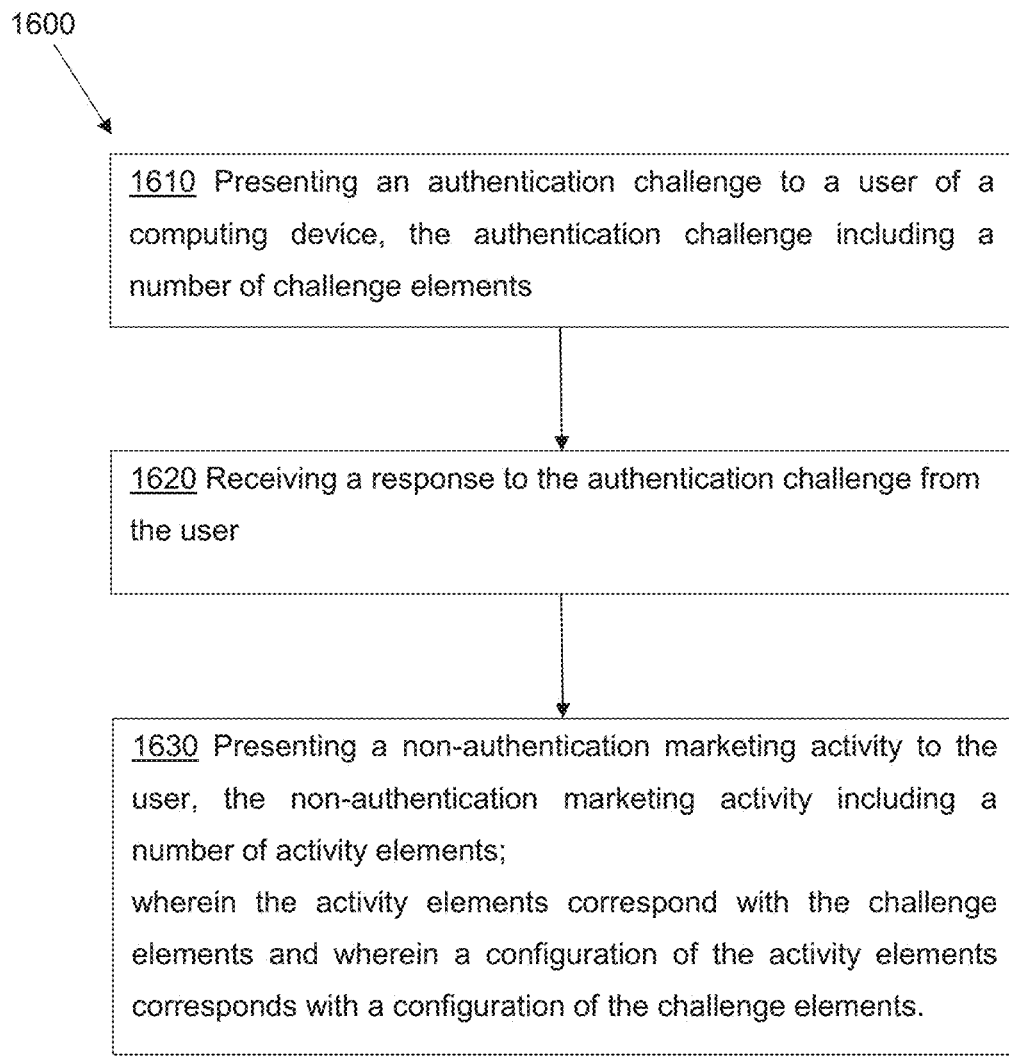
FIG. 16 illustrates a flow chart of a method for incorporating marketing into a user authentication according to an embodiment of the present invention.

FIG. 16 illustrates a block diagram of a method 1600 for incorporating marketing into user authentication according to an embodiment of the present invention. At step 1610, an authentication challenge is presented to a user of a computing device, the authentication challenge including a number of challenge elements. At step 1620, a response to the authentication challenge is received from the user. At step 1630, a non-authentication marketing activity is presented to the user, the non-authentication marketing activity including a number of activity elements, wherein the activity elements correspond with the challenge elements and a configuration of the activity elements corresponds with a configuration of the challenge elements.

FIG. 17 illustrates a block diagram of a method 1700 for incorporating marketing into user authentication according to an embodiment of the present invention. At step 1710, an authentication challenge is presented to a user of a computing device, the authentication challenge including a number of challenge elements and wherein presenting the authentication challenge includes presenting a challenge instruction to the user on how to perform the authentication challenge. At step 1720, a response to the authentication challenge is received from the user. At step 1730, a non-authentication marketing activity is presented to the user, the non-authentication marketing activity including a number of activity elements, wherein the activity elements correspond with the challenge elements.

Figure 18:
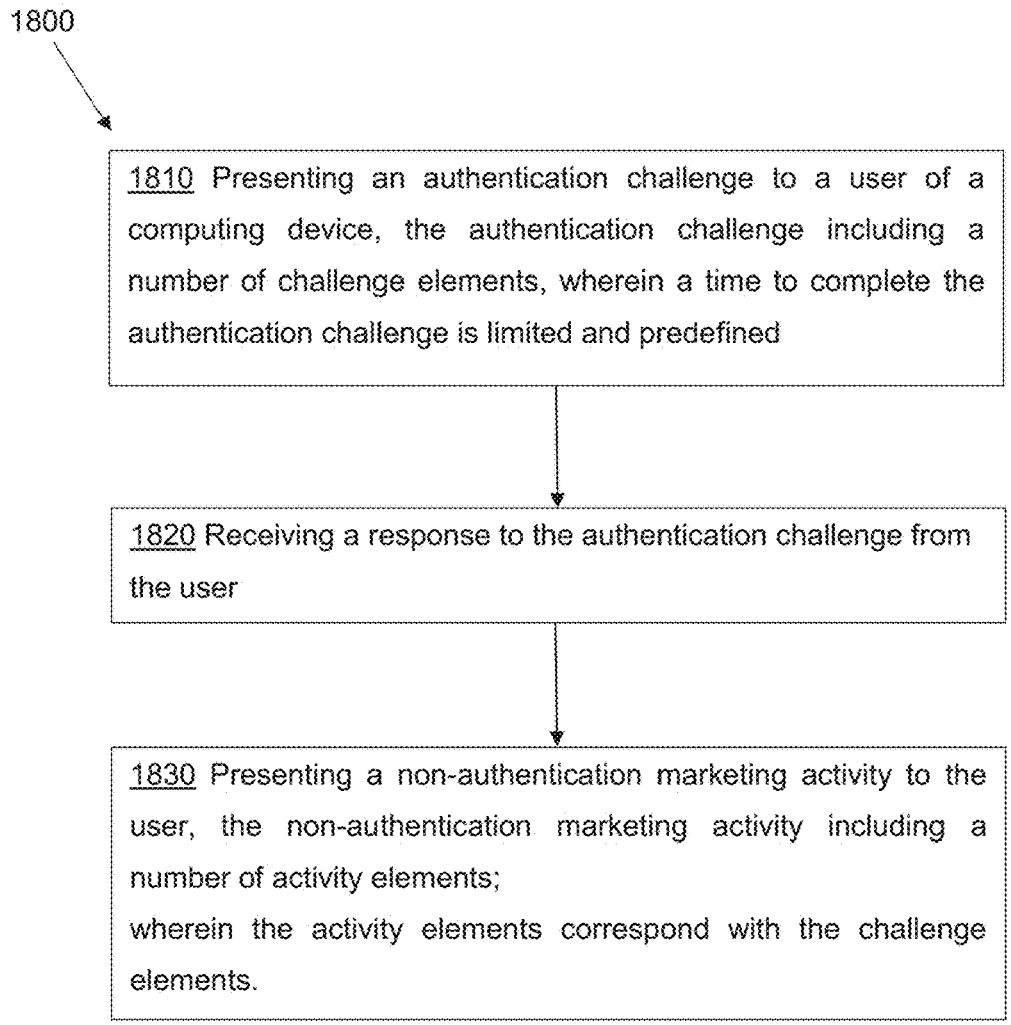
FIG. 18 illustrates a flow chart of a method for incorporating marketing into a user authentication according to an embodiment of the present invention.

FIG. 18 illustrates a block diagram of a method 1800 for incorporating marketing into user authentication according to an embodiment of the present invention. At step 1810, an authentication challenge is presented to a user of a computing device, the authentication challenge including a number of challenge elements and a time to complete the authentication challenge is limited and predefined. At step 1820, a response to the authentication challenge is received from the user. At step 1830, a non-authentication marketing activity is presented to the user, the non-authentication marketing activity including a number of activity elements, wherein the activity elements correspond with the challenge elements.

FIG. 19 illustrates a block diagram of a method 1900 for incorporating marketing into user authentication according to an embodiment of the present invention. At step 1910, a plurality of authentication challenges are presented to a user of a computing device in sequence, the authentication challenge including a number of challenge elements. At step 1920, a response to the authentication challenge is received from the user. At step 1930, a non-authentication marketing activity is presented to the user, the non-authentication marketing activity including a number of activity elements, wherein the activity elements correspond with the challenge elements.

Figure 20:
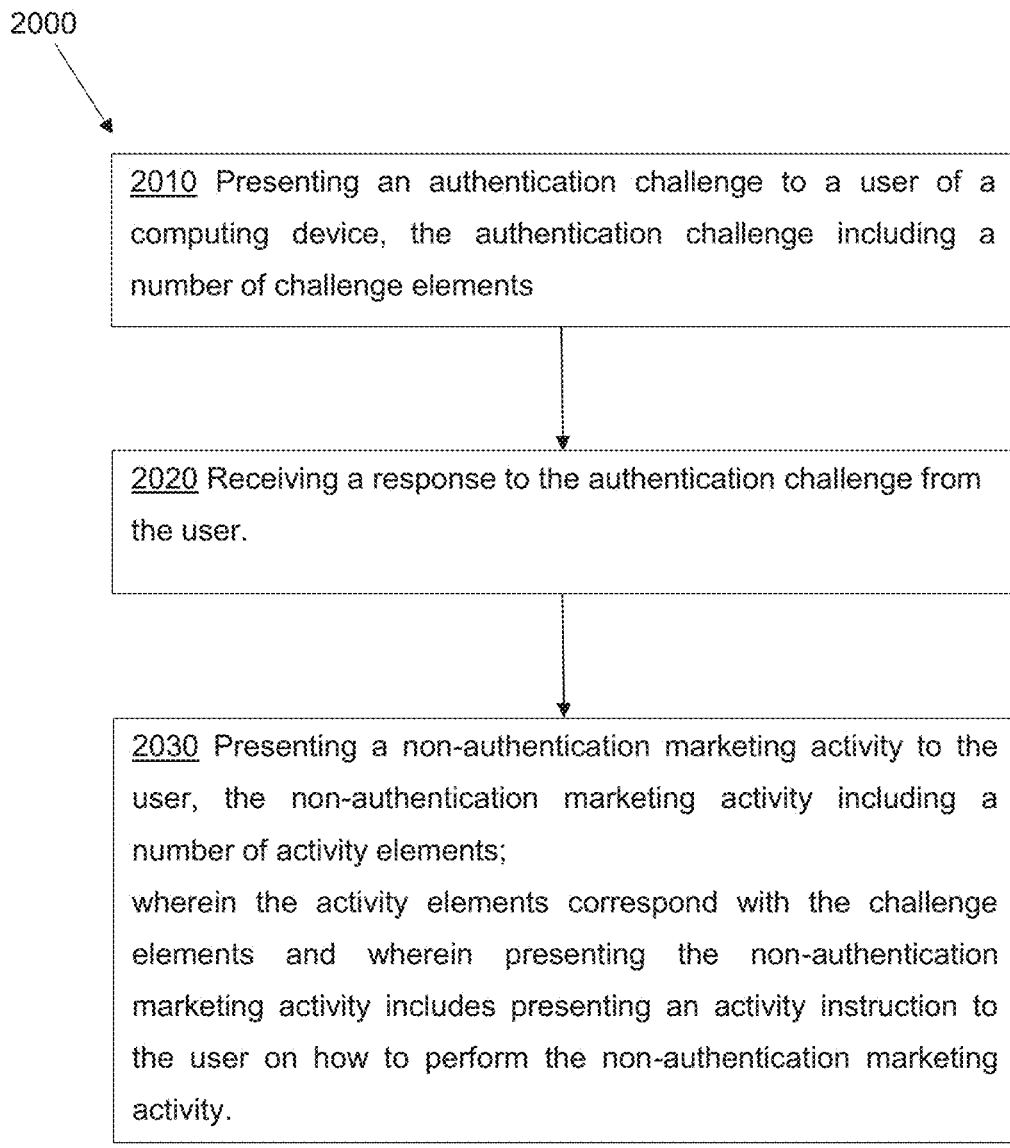
FIG. 20 illustrates a flow chart of a method for incorporating marketing into a user authentication according to an embodiment of the present invention.

FIG. 20 illustrates a block diagram of a method 2000 for incorporating marketing into user authentication according to an embodiment of the present invention. At step 2010, an authentication challenge is presented to a user of a computing device, the authentication challenge including a number of challenge elements. At step 2020, a response to the authentication challenge is received from the user. At step 2030, a non-authentication marketing activity is presented to the user, the non-authentication marketing activity including a number of activity elements, wherein the activity elements correspond with the challenge elements and presenting the non-authentication marketing activity includes presenting an activity instruction to the user on how to perform the non-authentication marketing activity.

FIG. 21 illustrates a block diagram of a method 2100 for incorporating marketing into user authentication according to an embodiment of the present invention. At step 2110, an authentication challenge is presented to a user of a computing device, the authentication challenge including a number of challenge elements, wherein one of the challenge elements is associated with a correct response to a challenge instruction, and a plurality of the challenge elements are associated with an incorrect response to a challenge instruction. At step 2120, a response to the authentication challenge is received from the user. At step 2130, a non-authentication marketing activity is presented to the user, the non-authentication marketing activity including a number of activity elements, wherein the activity elements correspond with the challenge elements.

FIG. 22 illustrates a block diagram of a method 2200 for incorporating marketing into user authentication according to an embodiment of the present invention. At step 2210, an authentication challenge is presented to a user of a computing device, the authentication challenge including a number of challenge elements, wherein the challenge elements include one of a plurality of visual components, a plurality of audio components, and a plurality of audio-visual components. At step 2220, a response to the authentication challenge is received from the user. At step 2230, a non-authentication marketing activity is presented to the user, the non-authentication marketing activity including a number of activity elements, wherein the activity elements correspond with the challenge elements.

FIG. 23 illustrates a block diagram of a method 2300 for incorporating marketing into user authentication according to an embodiment of the present invention. At step 2310, an authentication challenge is presented to a user of a computing device, the authentication challenge including a number of challenge elements, wherein the challenge elements include a plurality of visual components in the form of challenge images, and wherein the challenge images include one or more of the following: a number of distinct images; a single image with distinct images visible within the single image; images configured in a spatial arrangement formed at least in part by the plurality of challenge images. At step 2320, a response to the authentication challenge is received from the user. At step 2330, a non-authentication marketing activity is presented to the user, the non-authentication marketing activity including a number of activity elements, wherein the activity elements correspond with the challenge elements.

FIG. 24 illustrates a block diagram of a method 2400 for incorporating marketing into user authentication according to an embodiment of the present invention. At step 2410, an authentication challenge is presented to a user of a computing device, the authentication challenge including a number of challenge elements. At step 2420, a response to the authentication challenge is received from the user. At step 2430, a non-authentication marketing activity is presented to the user, the non-authentication marketing activity including a number of activity elements, wherein the activity elements correspond with the challenge elements and the activity elements include a plurality of visual components in the form of activity images configured in a grid formed at least in part by the plurality of activity images.

FIG. 25 illustrates a block diagram of a method 2500 for incorporating marketing into user authentication according to an embodiment of the present invention. At step 2510, an authentication challenge is presented to a user of a computing device, the authentication challenge including a number of challenge elements, wherein the challenge elements include a plurality of audio components in the form of challenge audio clips, wherein each challenge audio clip is presented sequentially to the user. At step 2520, a response to the authentication challenge is received from the user. At step 2530, a non-authentication marketing activity is presented to the user, the non-authentication marketing activity including a number of activity elements, wherein the activity elements correspond with the challenge elements.

In summary, the present method and system for incorporating marketing in user authentication enables valuable marketing information to be received from or provided to users, in a context where the users are likely to be attentive and focused. Thus marketing information is likely to be thoroughly reviewed by the users, easily recalled by the users at a later time, and user profile data collected from the users is likely to be accurate. Furthermore, marketing information is more likely to be received from or provided by users who have been authenticated as real humans, and not received from or provided by agents.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

The invention claimed is:

1. A method for incorporating marketing into authentication of a user to a computing resource, the method comprising:

presenting an authentication challenge to the user in a graphical user interface of at least one computing device, the authentication challenge including a first animated video and a first instruction directing the user to interact with the first animated video, wherein one or a plurality of individual animated first challenge elements are depicted as moving within the first animated video, wherein one or a plurality of individual animated second challenge elements are also depicted as moving within the first animated video, and wherein the graphical user interface allows the user to indicate one of the second challenge elements as a first response to the first instruction;

receiving the first response to the authentication challenge from the user;

authenticating the user based on the first response received;

presenting, at least in response to receiving the first response, a marketing activity to the user in the graphical user interface of the at least one computing device, the marketing activity including a second animated video and a second instruction directing the user to interact with the second animated video, wherein a plurality of individual animated activity elements are depicted as moving within the second animated video, and wherein the graphical user interface allows the user to indicate one of the activity elements as a second response to the second instruction;

receiving the second response as assured marketing information from the user; and providing, in response to receiving the second response and based on the authentication of the user, access of the user to the computing resource, wherein the animated activity elements embody one or a plurality of interface elements embodied within the animated challenge elements.

2. The method of claim 1, wherein the second response to the marketing activity is recorded after authenticating the user with a correct response to the authentication challenge received in the first response.

3. The method of claim 1, wherein the second response to the marketing activity is transmitted after authenticating the user with a correct response to the authentication challenge received in the first response.

4. The method of claim 1, wherein the marketing activity is presented to the user after authenticating the user with a correct response to the authentication challenge received in the first response.

5. The method of claim 1, wherein the marketing activity is a marketing data collection activity.

6. The method of claim 1, wherein a configuration of the activity elements corresponds with a configuration of the challenge elements.

7. The method of claim 1, wherein presenting the authentication challenge includes presenting a challenge instruction to the user on how to perform the authentication challenge.

8. The method of claim 1, wherein a time to complete the authentication challenge is limited and predefined.

9. The method of claim 1, wherein a plurality of authentication challenges is presented to the user, and each authentication challenge is presented in sequence.

10. The method of claim 1, wherein presenting the marketing activity includes presenting an activity instruction to the user on how to perform the marketing activity.

11. The method of claim 1, wherein one of the animated challenge elements is associated with a correct response to a challenge instruction, and a plurality of the animated challenge elements are associated with an incorrect response to a challenge instruction.

12. The method of claim 1, wherein the at least one computing device comprises one or more of a server, an authentication server, an advertising server, a client device, a stand-along computing device, a personal computer, a laptop, a tablet, and a smartphone.

13. The method of claim 1, wherein the marketing information from the user is assured based on the user being authenticated as a real human.

14. The method of claim 1, wherein providing the user access to the computing resource comprises providing the user access to a website.

15. A system for incorporating marketing into authentication of a user to a computing resource, the system including an authentication server, the authentication server including a processor coupled to a memory, the memory including program code instructions configured to cause the processor to:

send an authentication challenge for presentation to the user in a graphical user interface of a computing device, the authentication challenge including a first animated video and a first instruction directing the user to interact with the first animated video, wherein one or a plurality of individual animated first challenge elements are depicted as moving within the first animated video, wherein one or a plurality of individual animated second challenge elements are also depicted as moving within the first animated video, and wherein the graphical user interface allows the user to indicate one of the second challenge elements as a first response to the first instruction;

receive the first response to the authentication challenge from the user;

authenticate the user based on the first response received;

send, at least in response to receiving the first response, a marketing activity for presentation to the user in the graphical user interface of the computing device, the marketing activity including a second animated video and a second instruction directing the user to interact with the second animated video, wherein a plurality of individual animated activity elements are depicted as moving within the second animated video, and wherein the graphical user interface allows the user to indicate one of the activity elements as a second response to the second instruction;

receive the second response as assured marketing information from the user; and providing, in response to receiving the second response and based on the authentication of the user, access of the user to the computing resource, wherein the animated activity elements embody one or a plurality of interface elements embodied within the animated challenge elements.

16. The system of claim 15, wherein the computing device of the user is different than the authentication server that receives the response to the authentication challenge.

17. A computing device for incorporating marketing into a user authentication, including a processor coupled to a memory, the memory including program code instructions configured to cause the processor to:

send an authentication challenge for presentation to a user in a graphical user interface, the authentication challenge including a first animated video and a first instruction directing the user to interact with the first animated video, wherein one or a plurality of individual animated first challenge elements are depicted as moving within the first animated video, wherein one or a plurality of individual animated second challenge elements are also depicted as moving within the first animated video, and wherein the graphical user interface allows the user to indicate one of the second challenge elements as a first response to the first instruction;

receive the first response to the authentication challenge from the user;

authenticate the user based on the first response received;

send, at least in response to receiving the first response, a marketing activity for presentation to the user in the graphical user interface, the marketing activity including a second animated video and a second instruction directing the user to interact with the second animated video, wherein a plurality of individual animated activity elements are depicted as moving within the second animated video, and wherein the graphical user interface allows the user to indicate one of the activity elements as a second response to the second instruction;

receive the second response as assured marketing information from the user; and provide, in response to receiving the second response and based on the authentication of the user, access of the user to the computing resource, wherein the animated activity elements embody one or a plurality of interface elements embodied within the animated challenge elements.

18. The computing device of claim 17, wherein the authentication challenge is encrypted before being sent to the user.

19. The computing device of claim 18, wherein to send the authentication challenge, the program code instructions are configured to cause the processor to:

send a key to decrypt encrypted challenge elements of the encrypted authentication challenge, determine that a time between sending the key to decrypt encrypted challenge elements and receiving the first response to the authentication challenge is longer than a pre-determined time, and determine, based on the time being longer than the pre-determined time, that the first response to the authentication challenge is an incorrect response.

* * * * *